United States Patent
Doi et al.

(10) Patent No.: US 11,367,032 B2
(45) Date of Patent: Jun. 21, 2022

(54) SYSTEM AND METHOD FOR SUPPORTING PRODUCTION MANAGEMENT

(71) Applicant: Hitachi, Ltd., Tokyo (JP)

(72) Inventors: Yoshihito Doi, Tokyo (JP); Kenichirou Kawakami, Tokyo (JP); Megumi Sakai, Tokyo (JP); Yusuke Yajima, Tokyo (JP); Shigeyasu Kubo, Tokyo (JP); Kazuhiro Matsuya, Tokyo (JP)

(73) Assignee: HITACHI, LTD., Tokyo (JP)

(*) Notice: Subject to any disclaimer, the term of this patent is extended or adjusted under 35 U.S.C. 154(b) by 8 days.

(21) Appl. No.: 17/020,898

(22) Filed: Sep. 15, 2020

(65) Prior Publication Data
US 2021/0125125 A1     Apr. 29, 2021

(30) Foreign Application Priority Data
Oct. 25, 2019 (JP) ............... JP2019-194817

(51) Int. Cl.
*G06Q 10/06*     (2012.01)

(52) U.S. Cl.
CPC .............. *G06Q 10/06313* (2013.01)

(58) Field of Classification Search
CPC ....................................... G06Q 10/06
See application file for complete search history.

(56) References Cited

U.S. PATENT DOCUMENTS

| | | | | |
|---|---|---|---|---|
| 2008/0312979 A1* | 12/2008 | Lee | ........... | G06Q 10/06375 705/7.28 |
| 2010/0082386 A1* | 4/2010 | Cao | ........... | G06Q 10/0631 705/7.39 |
| 2010/0274633 A1* | 10/2010 | Scrivano | ........... | G06Q 10/087 705/7.11 |
| 2011/0125895 A1* | 5/2011 | Anderson | ........... | H04L 63/0815 709/224 |
| 2015/0097840 A1 | 4/2015 | Nishimura et al. | | |

(Continued)

FOREIGN PATENT DOCUMENTS

| | | |
|---|---|---|
| JP | 2003-242322 A | 8/2003 |
| JP | 2005-115851 A | 4/2005 |

(Continued)

OTHER PUBLICATIONS

Japanese Office Action received in corresponding Japanese Application No. 2019-194817 dated Aug. 24, 2021.

*Primary Examiner* — Kurtis Gills
(74) *Attorney, Agent, or Firm* — Mattingly & Malur, PC

(57) ABSTRACT

As a plurality of resource types relating to production, there are two or more resource types including Money from among resource types of Man, Machine, Material, and Money. Execution past record information indicates, for each of one or more resource types other than Money and for each resource belonging to the resource type, a step performed on the resource and an execution time block of the step. Expense information indicates, for at least one of the above-mentioned one or more resource types and for each resource belonging to the resource type, an expense relating to the resource. The system displays a cost chart based on the result of the cost calculation process. The cost chart shows costs in management unit same as or different from those of the steps, and has a time axis and a management unit axis (axis perpendicular to the time axis).

12 Claims, 20 Drawing Sheets

(56) References Cited

U.S. PATENT DOCUMENTS

| | | |
|---|---|---|
| 2018/0284758 A1* | 10/2018 | Celia ................. G05B 23/0229 |
| 2018/0301171 A1 | 10/2018 | Yamana et al. |
| 2020/0051181 A1 | 2/2020 | Moritomo et al. |
| 2020/0150636 A1 | 5/2020 | Matsuya |
| 2020/0209838 A1 | 7/2020 | Kawakami et al. |

FOREIGN PATENT DOCUMENTS

| | | |
|---|---|---|
| JP | 2014-2705 A | 1/2014 |
| JP | 2016-207059 A | 12/2016 |
| JP | 6287018 B2 | 3/2018 |
| JP | 2018-180958 A | 11/2018 |
| WO | 2019/064892 A1 | 4/2019 |

\* cited by examiner

FIG. 4

EXECUTION PAST RECORD TABLE GROUP 351

_401_

| PRODUCT ID 411 | TIME POINT 412 | STEP ID 413 | STATUS 414 |
|---|---|---|---|
| id0001 | 2019-04-12 11:29:00 | 1 | START |
| id0001 | 2019-04-12 12:43:00 | 1 | END |
| ... | ... | ... | ... |

_402_

| WORKER ID 421 | TIME POINT 422 | TARGET PRODUCT 423 | STEP ID 424 | STATUS 425 |
|---|---|---|---|---|
| wk01 | 2019-04-12 11:29:00 | id0001 | 1 | START |
| wk01 | 2019-04-12 12:43:00 | id0001 | 1 | END |
| ... | ... | ... | ... | ... |

_403_

| FACILITY ID 431 | TIME POINT 432 | TARGET PRODUCT 433 | STEP ID 434 | STATUS 435 |
|---|---|---|---|---|
| eq001 | 2019-04-12 11:29:00 | id0001 | 1 | START |
| eq001 | 2019-04-12 12:43:00 | id0001 | 1 | END |
| ... | ... | ... | ... | ... |

_404_

| PART ID 441 | TIME POINT 442 | TARGET PRODUCT 443 | STEP ID 444 | STATUS 445 |
|---|---|---|---|---|
| pt001 | 2019-04-12 11:29:00 | id0001 | 1 | START |
| pt002 | 2019-04-12 11:29:00 | id0001 | 1 | START |
| ... | ... | ... | ... | ... |

FIG. 5

EXECUTION PLAN TABLE GROUP 352

501

| 511 | 512 | 513 | 514 |
|---|---|---|---|
| PRODUCT ID | TIME POINT | STEP ID | STATUS |
| id0001 | 2019-04-12 11:00:00 | 1 | START |
| id0001 | 2019-04-12 12:00:00 | 1 | END |
| ... | ... | ... | ... |

502

| 521 | 522 | 523 | 524 | 525 |
|---|---|---|---|---|
| WORKER ID | TIME POINT | TARGET PRODUCT | STEP ID | STATUS |
| wk01 | 2019-04-12 11:00:00 | id0001 | 1 | START |
| wk01 | 2019-04-12 12:00:00 | id0001 | 1 | END |
| ... | ... | ... | ... | ... |

503

| 531 | 532 | 533 | 534 | 535 |
|---|---|---|---|---|
| FACILITY ID | TIME POINT | TARGET PRODUCT | STEP ID | STATUS |
| eq001 | 2019-04-12 11:00:00 | id0001 | 1 | START |
| eq001 | 2019-04-12 12:00:00 | id0001 | 1 | END |
| ... | ... | ... | ... | ... |

504

| 541 | 542 | 543 | 544 | 545 |
|---|---|---|---|---|
| PART ID | TIME POINT | TARGET PRODUCT | STEP ID | STATUS |
| pt001 | 2019-04-12 11:00:00 | id0001 | 1 | START |
| pt002 | 2019-04-12 11:00:00 | id0001 | 1 | START |
| ... | ... | ... | ... | ... |

FIG. 6

EXPENSE TABLE GROUP 353

601

| TARGET PRODUCT | TARGET PRODUCT | COST PRICE |
|---|---|---|
| pt0001 | id0001 | 50 |
| pt0002 | id0001 | 100 |
| ... | ... | ... |

611 / 612 / 613

602

| WORKER ID | NAME | PERSONNEL EXPENSES |
|---|---|---|
| wk01 | A | 600/h |
| wk02 | B | 450/h |
| ... | ... | ... |

EVENT PAST RECORD TABLE GROUP 354

701

| PRODUCT ID 711 | TIME POINT 712 | STEP ID 713 | EVENT 714 |
|---|---|---|---|
| id0025 | 2019-04-12 15:29:00 | 1 | X1 DEFECTIVE |
| id0031 | 2019-04-13 16:43:00 | 3 | REWORK |
| ... | ... | ... | ... |

702

| WORKER ID 721 | TIME POINT 722 | TARGET PRODUCT 723 | STEP ID 724 | EVENT 725 |
|---|---|---|---|---|
| wk01 | 2019-04-12 11:29:00 | NONE | NONE | BREAK TIME |
| wk03 | 2019-04-12 12:43:00 | id0041 | 1 | A1 TROUBLE SHOOTING |
| ... | ... | ... | ... | ... |

703

| FACILITY ID 731 | TIME POINT 732 | TARGET PRODUCT 733 | STEP ID 734 | EVENT 735 |
|---|---|---|---|---|
| eq004 | 2019-04-12 09:29:00 | id0054 | 1 | B1 ABNORMALITY |
| eq004 | 2019-04-12 10:43:00 | id0054 | 1 | B1 ABNORMALITY RECOVERY |
| ... | ... | ... | ... | ... |

704

| PART ID 741 | TIME POINT 742 | TARGET PRODUCT 743 | STEP ID 744 | EVENT 745 |
|---|---|---|---|---|
| pt0001 | 2019-04-12 11:29:00 | id0001 | 1 | NORMAL |
| pt0001 | 2019-04-12 11:31:00 | id0001 | 1 | Y1 DEFECTIVE |
| ... | ... | ... | ... | ... |

FIG. 8

ALERT TABLE GROUP 355

801

| EVENT | ALERT ID | PRODUCT ALERT LEVEL | PRODUCT/COST PERSPECTIVE ALERT LEVEL |
|---|---|---|---|
| X1 DEFECTIVE | 001 | 1 | 1 |
| X2 DEFECTIVE | 002 | 2 | 2 |
| ... | | | |

802

| EVENT | ALERT ID | WORKER ALERT LEVEL | WORKER/COST PERSPECTIVE ALERT LEVEL |
|---|---|---|---|
| A1 TROUBLE SHOOTING | 101 | 1 | 1 |
| TROUBLE SHOOTING | 102 | 2 | 2 |
| ... | | | |

803

| EVENT | ALERT ID | FACILITY ALERT LEVEL | FACILITY/COST PERSPECTIVE ALERT LEVEL |
|---|---|---|---|
| B1 ABNORMALITY | 201 | 1 | 1 |
| B2 ABNORMALITY | 202 | 3 | 3 |
| ... | | | |

804

| EVENT | ALERT ID | PART ALERT LEVEL | PART/COST PERSPECTIVE ALERT LEVEL |
|---|---|---|---|
| Y1 DEFECTIVE | 301 | 1 | 1 |
| Y2 DEFECTIVE | 302 | 2 | 2 |
| ... | | | |

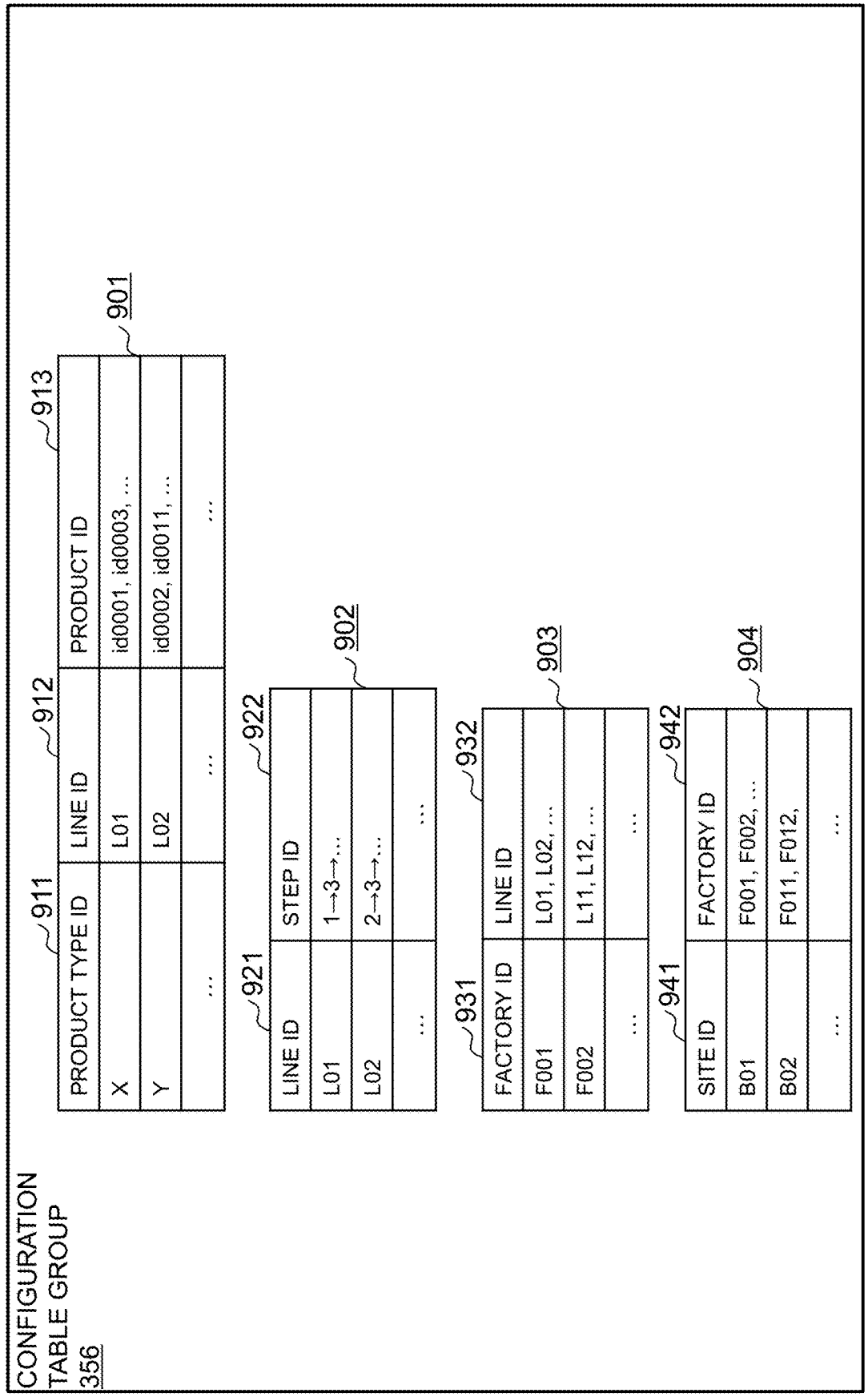

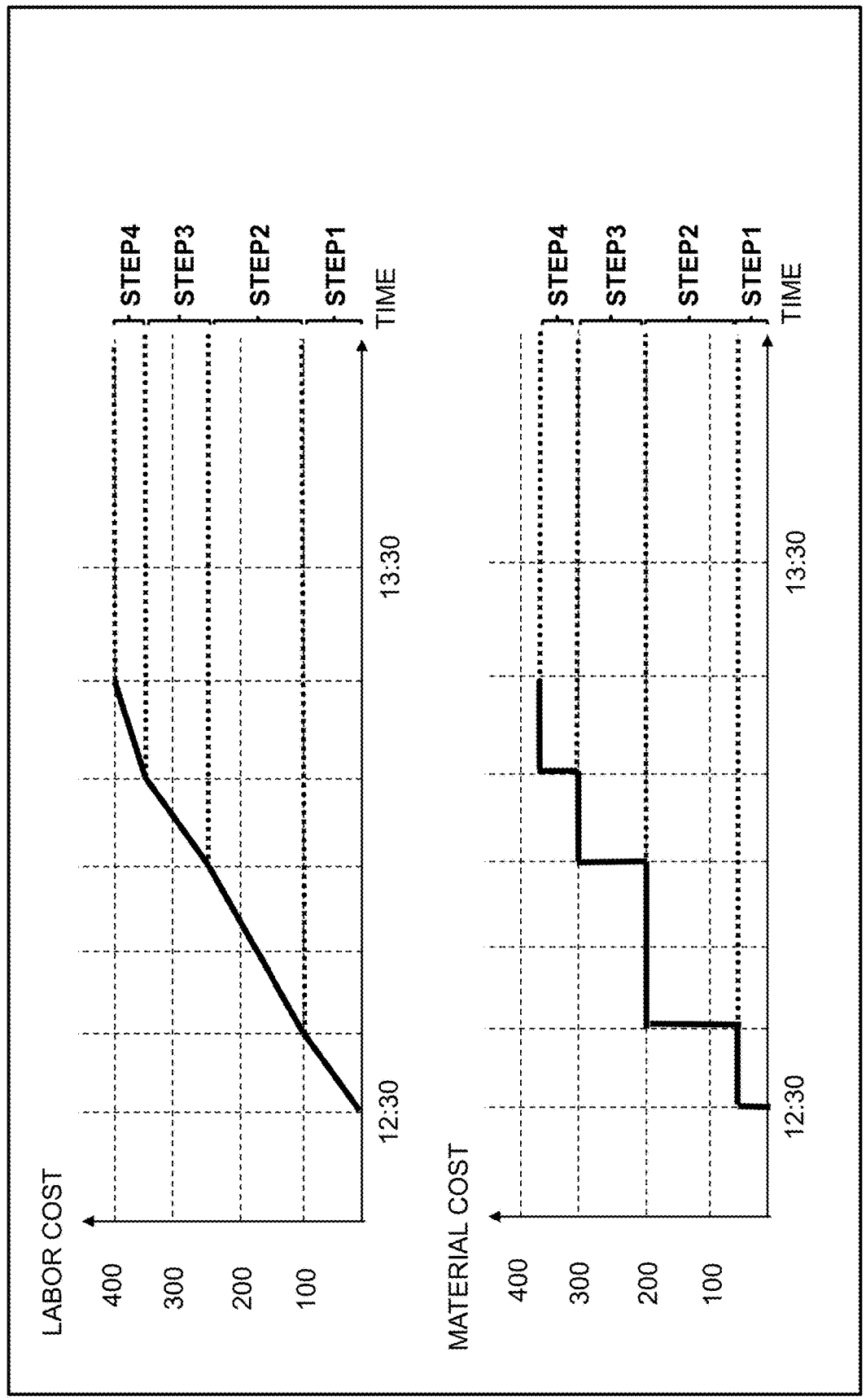

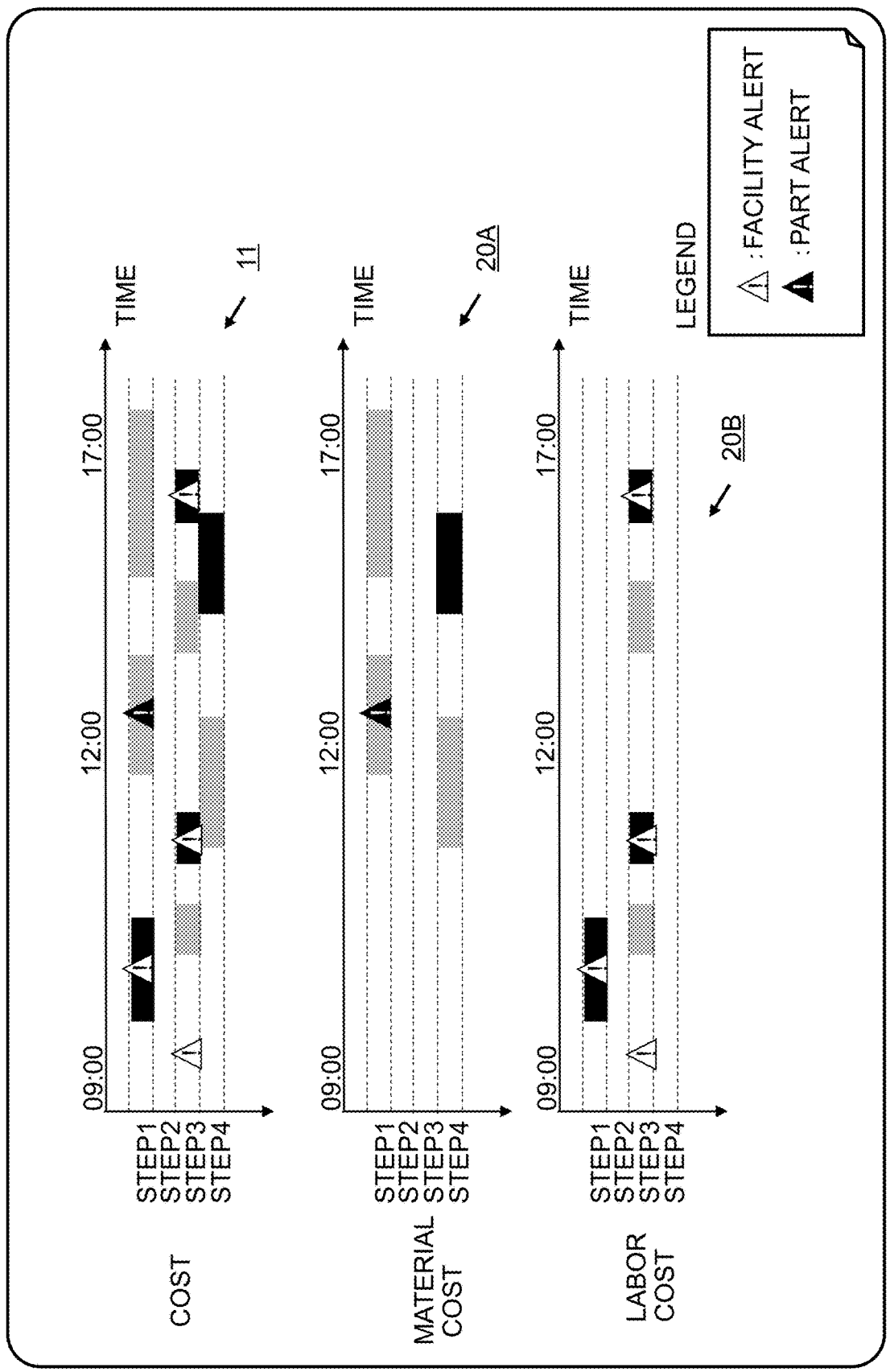

SYSTEM AND METHOD FOR SUPPORTING PRODUCTION MANAGEMENT

CROSS-REFERENCE TO PRIOR APPLICATION

This application relates to and claims the benefit of priority from Japanese Patent Application number 2019-194817, filed on Oct. 25, 2019, the entire disclosure of which is incorporated herein by reference.

BACKGROUND

The present invention generally relates to a computer technique for supporting production management.

As a technique for supporting production management, the visualization technique disclosed in Document 1 is known, for example. In the technique disclosed in Japanese Patent No. 6287018, for each product, start time points of a plurality of steps are coupled with lines and end time points of the plurality of steps are coupled with lines.

Document 1: Japanese Patent No. 6287018

SUMMARY

In production management, at least one of so-called 3M, i.e., Man (persons involved in production), Machine (facility related to production), and Material (product related to production (or parts thereof)) is managed. The visualization technique of Japanese Patent No. 6287018 allows a production time and a wait time to be visually recognized for each product. In other words, the management of Material is possible.

However, no support is provided for the management of Money (production cost). In production management, the management of Money is desired instead of or in addition to at least one management among 3M. Money is a piece of information that affects business performance of a production company. Proper management of Money may contribute to the development of industry. One reason for this is that the production cost can be appropriately reduced, and at least part of saving gained from the reduction in production cost can be used for development.

A system executes a cost calculation process that is a process of calculating a relationship between a time point and cost on the basis of execution past record information and expense information. The execution past record information and the expense information are at least part of the management information of the production system having a plurality of steps. As a plurality of resource types relating to production, there are two or more resource types including Money from among resource types of Man, Machine, Material, and Money. The execution past record information indicates, for each of one or more resource types other than Money from among the plurality of resource types and for each resource belonging to the resource type, a step performed on the resource and an execution time block of the step. The expense information indicates, for at least one of the above-mentioned one or more resource types and for each resource belonging to the resource type, an expense relating to the resource. The system displays a cost chart based on the result of the cost calculation process. The cost chart shows costs in management units same as or different from those of the steps, and has a time axis and a management unit axis (axis perpendicular to the time axis).

According to the present invention, it is possible to provide a technical support for Money management.

BRIEF DESCRIPTION OF THE DRAWINGS

FIG. 4 shows an example of an execution past record table group;
FIG. 5 shows an example of an execution plan table group;
FIG. 6 shows an example of an expense table group;
FIG. 7 shows an example of an event past record table group;
FIG. 8 shows an example of an alert table group;
FIG. 9 shows an example of a configuration table group;
FIG. 10 shows an example of calculation of labor costs and material costs, which are cost elements;
FIG. 20 shows a second modification.

DESCRIPTION OF EMBODIMENTS

Figure 1:
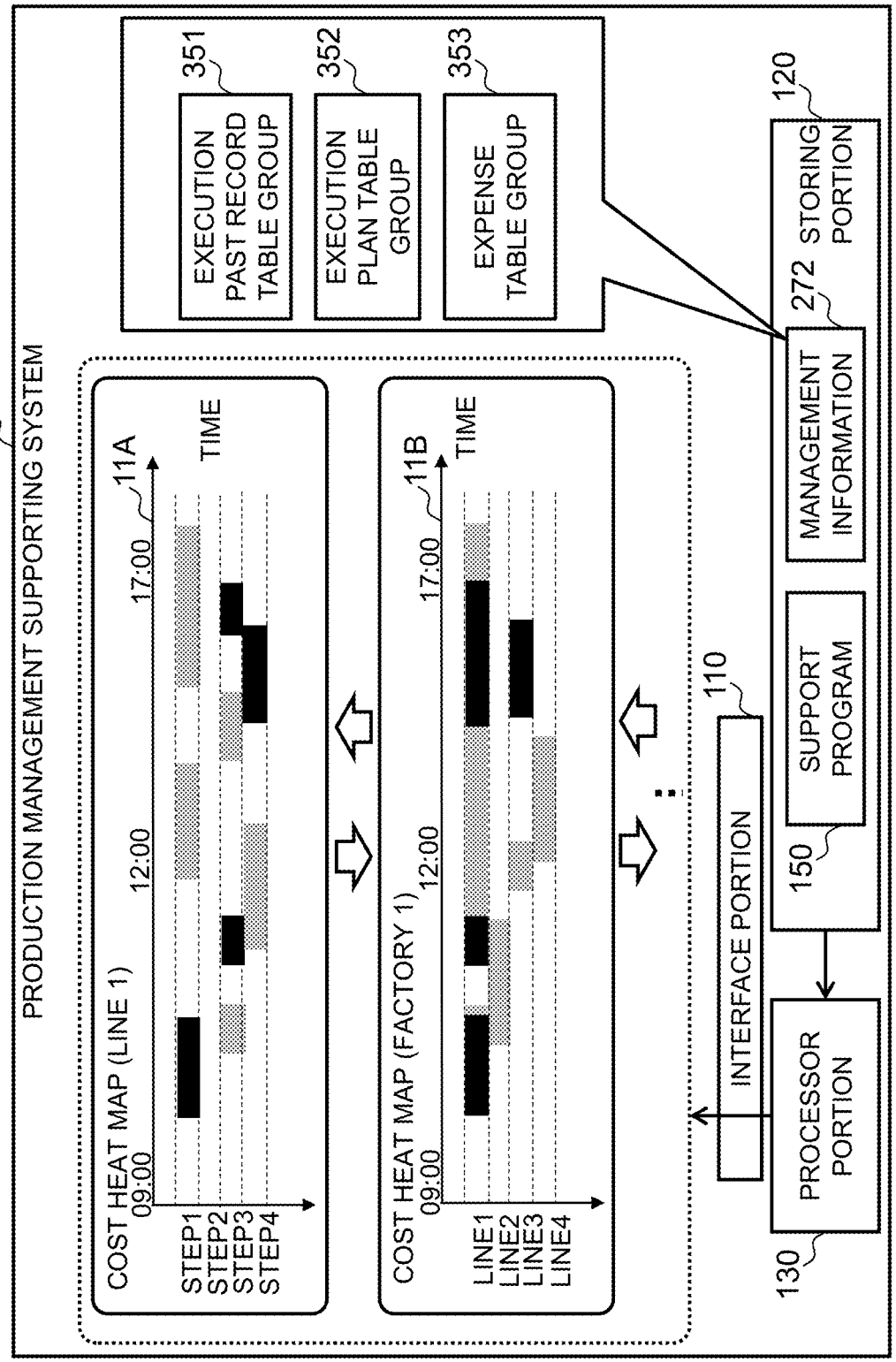
FIG. 1 shows the outline of an embodiment.

In the following description, an "interface portion" includes one or more interfaces. The one or more interfaces may include at least one of a user interface portion and a communication interface portion. The user interface portion may include at least one I/O device among one or more I/O devices (e.g., input devices (e.g., a keyboard and a pointing device) and an output device (e.g., a display device)) and a display computer or may include an interface device for the at least one I/O device. The communication interface portion may include one or more communication interface devices. The one or more communication interface devices may be one or more communication interface devices of the same type (i.e., one or more network interface cards (NICs)) or two or more communication interface devices of different types (e.g., a NIC and a host bus adapter (HBA)).

In the following description, a "storing portion" includes one or more memories. At least one of the memories associated with the storing portion may appropriately be a volatile memory. The storing portion is used mainly during a process performed by the processor portion. The storing portion may also include, in addition to the memories, one or more nonvolatile storing devices (e.g., hard disk drives (HDDs) or solid state drives (SSDs)).

In the following description, the "processor portion" includes one or more processors. At least one of the processors is typically a microprocessor such as a central processing unit (CPU), but the processors may also include a processor of another type such as graphics processing unit (GPU). Each of the one or more processors may be a single-core processor or a multi-core processor. The processors may also include a hardware circuit which performs a part or the whole of a process.

In the following description, a process may be described using a "program" as a subject. Since a program performs a determined process by being executed by the processor portion, while appropriately using the storing portion (e.g., memory), the interface portion (e.g., communication port), and/or the like, the subject of the processor may also be the processor. The process described using the program as the subject may also be a process performed by the processor portion or an apparatus having the processor portion. The processor portion may also include a hardware circuit (e.g., field-programmable gate array (FPGA) or an application specific integrated circuit (ASIC)) which performs a part or the whole of the process. The program may also be installed from a program source to an apparatus such as a computer. The program source may be, e.g., a program distribution server or a recording medium (e.g., non-transitory recording medium) which is readable by the computer. In the following description, two or more programs may be implemented as one program or one program may be implemented as two or more programs.

In the following description, information may be described using such an expression as "a xxx table", but the information may be expressed using any data structure. Specifically, to show that the information does not depend on any data structure, "a xxx table" can be referred to also as "xxx information". Also, in the following description, a configuration of each table is exemplary. One table may be divided into two or more tables or all or any of two or more tables may be one table.

In the following description, a "production management supporting system" may be configured to include one or more computers. Specifically, when, e.g., a computer has a display device and displays information on the display device thereof, the computer may appropriately be the production management supporting system. Alternatively, when, e.g., a first computer (e.g., management server) transmits information to be displayed to a remote second computer (display computer (e.g., management client)) and the display computer displays the information (when the first computer displays the information on the second computer), at least the first computer of the first and second computers may appropriately be the production management supporting system. The production management supporting system may also have an interface portion, a storing portion, and a processor portion coupled to the interface portion and the storing portion. The "display of information to be displayed" by the computer in the production management supporting system may be the display of information to be displayed on the display device of the computer or may also be the transmission of the information to be displayed from the computer to the display computer (in the latter case, the display computer displays the information to be displayed). The function of at least one of the management server in the production management supporting system and the production management supporting system may also be implemented by a virtual computer (e.g., virtual machine (VM)) implemented by at least one physical computer (e.g., a physical calculation resource on a cloud basis). At least a portion of the production management supporting system may be software-defined.

A "product" generally means a produced item, i.e., a finished product. However, in the following description, the "product" means each of the items loaded in a production system. Accordingly, in the following description, the "product" may be any of an item before loaded into the production system, an item currently in the production system (i.e., "semi-finished product"), and a finished product in a shippable state through all the corresponding steps in the production system.

Also, in the following description, the intra-step range of a step x (x is a natural number) may be referred to as an "intra-step range x", while an inter-step range between the step x and a step y may be referred to as an "inter-step range x-y". However, for ease of explanation, in the following description, at least the intra-step range x of the intra-step range x and the inter-step range x-y is simply referred to as "step x".

In some cases in the following description, in the case where the same type of components are described without being distinguished, a common part of symbols is used. In the case where the same type of components are distinguished, symbols are used. For example, when cost heat maps are not discriminated from each other, each of the cost heat maps may be referred to as a "cost heat map 11". When the cost heat maps are discriminated for each other, each of the cost heat maps may be referred to as a "cost heat map 11A" or "cost heat map 11B".

FIG. 1 shows the outline of the embodiment. Note that, in the following description, "UI", which stands for user interface, typically refers to a graphical user interface (GUI). Also, in the following description, the "production cost" is simply referred to as the "cost".

A production management supporting system 100 has an I/F (interface) portion 110, a storing portion 120, and a processor portion 130 coupled to the I/F portion 110 and the storing portion 120. The storing portion 120 stores management information 272 and a support program 150.

The management information 272 includes an execution past record table group 351 (an example of the execution past record information) and also an expense table group 353 (an example of the expense information). As a plurality of resource types related to production, there are two or more resource types of Man, Machine, Material, and Money but always including Money. In the present embodiment, there are given four resource types: Man, Machine, Material, and Money. One or some of Man, Machine and Material may be not given.

The execution past record table group 351 includes information that indicates, for each of the resource types other than Money among the plurality of resource types, for each resource belonging to the resource type, a step performed on the resource and an execution time block of the step. The execution past record table group 351 may be data collected from facilities in the production system and/or data input by a worker or a user (e.g., an administrator).

From the execution past record table group 351, relationships between the resource types, the resources, the steps, and the execution time blocks are understood. For the execution past record table group 351 representing such relationships, the expense table group 353 is prepared. The expense table group 353 includes information that indicates, for at least one resource type other than Money, for each resource belonging to the resource type, an expense related to the resource.

Specifically, as will be described later, from the execution past record table group 351, the step and the execution time block of each product can be known, and the expense table group 353 includes expense information applicable to a fine granularity of information specified from such an execution past record table group 351 so that costs can be calculated for product, step, and time point. For example, integrating the costs of a product or a step in time series makes it possible to calculate the cost of the product or the step.

This allows the support program 150 to execute a cost calculation process that is a process of calculating a relationship between a time point and cost based on the execution past record table group 351 and the expense table group 353. The support program 150 displays a cost chart that is a chart based on the result of the cost calculation process and that shows costs in the same or different management unit as the steps. In this way, the costs can be visualized as one support for the production management. Note that the cost chart has a time axis and a management unit axis (axis corresponding to the management unit) perpendicular to the time axis. Accordingly, the relationship between the time point and cost is visualized for each management unit. The time axis covers a display target period (e.g., a period specified by the user). In the present embodiment, the time axis is the horizontal axis and the management unit axis is the vertical axis. However, the time axis may be the vertical axis and the management unit axis may be the horizontal axis.

In the present embodiment, the cost chart is the cost heat map 11. The cost heat map 11 may be an example of UI. In the cost heat map 11, the display mode at each time point in each management unit depends on the magnitude of the differential cost at that time point. Specifically, for example, the cost heat map 11 has a band region (band-like display area) extending in parallel with the time axis for each management unit. In each band region, the display form of a range for each time point is a density corresponding to the magnitude of the differential cost generated at that time point. The greater the differential cost, the higher the density may be. In the present embodiment, the density is adopted in accordance with a certain threshold or more, from among the cost thresholds at which the differential cost is 1 or more. The density of the range corresponding to the differential cost smaller than the minimum cost threshold may be zero. This allows the user to intuitively recognize the relationship between the management unit, time point, and cost. Note that for each time point, the "differential cost" may be a value obtained by subtracting a planned cost for the time point from the actual cost at the time point. For each time point, the "actual cost" may be a cost calculated based on the execution past record table group 351 and the expense table group 353 in the cost calculation process. For each time point, the planned cost may be a cost scheduled for the time point. For each time point, the planned cost may be determined in advance, or may be calculated based on the expense table group 353 and an execution plan table group 352 described later in the cost calculation process.

As the management unit, there are a plurality of types of management units having different granularity (in other words, different levels). Examples of the types of management units include step, line, factory, and site in order of decreasing granularity. A plurality of management units including a plurality of steps have a tree structure. One line has two or more steps, for example, line 1 has steps 1 to 4, line 2 has steps 1, 4 and 7, and the like. One factory has one or more lines, for example, factory 1 has lines 1 to 4, factory 2 has lines 5 to 8, and the like. One site has one or more factories, for example, site 1 has factories 1 and 2, site 2 has factories 3 to 5, and the like. For each management unit, a management unit with a finer granularity than the corresponding management unit can be referred to as a "lower management unit", and a management unit with one granularity finer than the corresponding management unit among the lower management units can be referred to as a "child management unit". On the other hand, for each management unit, a management unit with a coarser granularity than the corresponding management unit can be referred to as a "higher management unit", and a management unit with one granularity coarser than the corresponding management unit among the higher management units can be referred to as a "parent management unit".

For the administrative side, it can be considered preferable to see the costs from a higher perspective. For example, there is a need to make the granularity of at least one of management unit and period coarse (e.g., to set the management unit to site or factory and the period to yearly or monthly) to see the costs from a higher perspective.

On the other hand, on a worksite side involving the management unit pointed out by the administrative side, it can be considered preferable to see the costs in detail in order to improve the costs of the management unit pointed out by the administrative side. For example, there is a need to make the granularity of at least one of management unit and period fine (e.g., to set the management unit to factory or line and the period to day or hour) to see the costs from a higher perspective.

Accordingly, in the present embodiment, the support program 150 can display the cost heat map 11 with a coarse granularity or a fine granularity based on the result of the cost calculation process (i.e., based on the same information). For example, the support program 150 receives a specification of the management unit, and displays a cost chart for one or more child management units belonging to the specified management unit in the tree structure. As a result, it can be expected to carry out appropriate information sharing and cooperation between different persons such as between a person on the administrative side and a person on the worksite side. Specifically, while the cost heat map (an example of the cost chart) that has the time axis and the management unit axis is maintained, data is collected or subdivided according to the granularity of the management unit. Therefore, it can be expected to provide prompt communication between the person on the administrative side and the person on the worksite side. According to the example shown in FIG. 1, it is assumed that the support program 150 generates a cost heat map 11B for lines 1 to 4 belonging to factory 1 and displays the cost heat map 11B. It is assumed that the support program 150 receives a selection of line 1 through a user operation on the cost heat map 11B. In this case, the support program 150 generates a cost heat map 11A for steps 1 to 4 belonging to line 1, and displays the cost heat map 11A instead of or in addition to the cost heat map 11B. In this way, it is possible to perform a drilldown display from the cost heat map 11 for the management unit with a coarse granularity to the cost heat map 11 for the management unit with a fine granularity.

Note that a display in which the granularity of the management unit is changed, such as the drilldown display, can be performed based on the result of the cost calculation process, but as an example, the display may be performed as follows. In other words, in the cost calculation process, the support program 150 may calculate a cost for each time point in each step. The step is an example of a management unit with the finest granularity. In order to display the cost heat map 11 for a management unit with a coarser granularity (e.g., line or factory), the support program 150 may integrate, for each management unit, the costs obtained at respective time points in all the steps lower than the corresponding management unit to calculate a cost at each time point.

The following will describe the present embodiment in detail.

Figure 2:
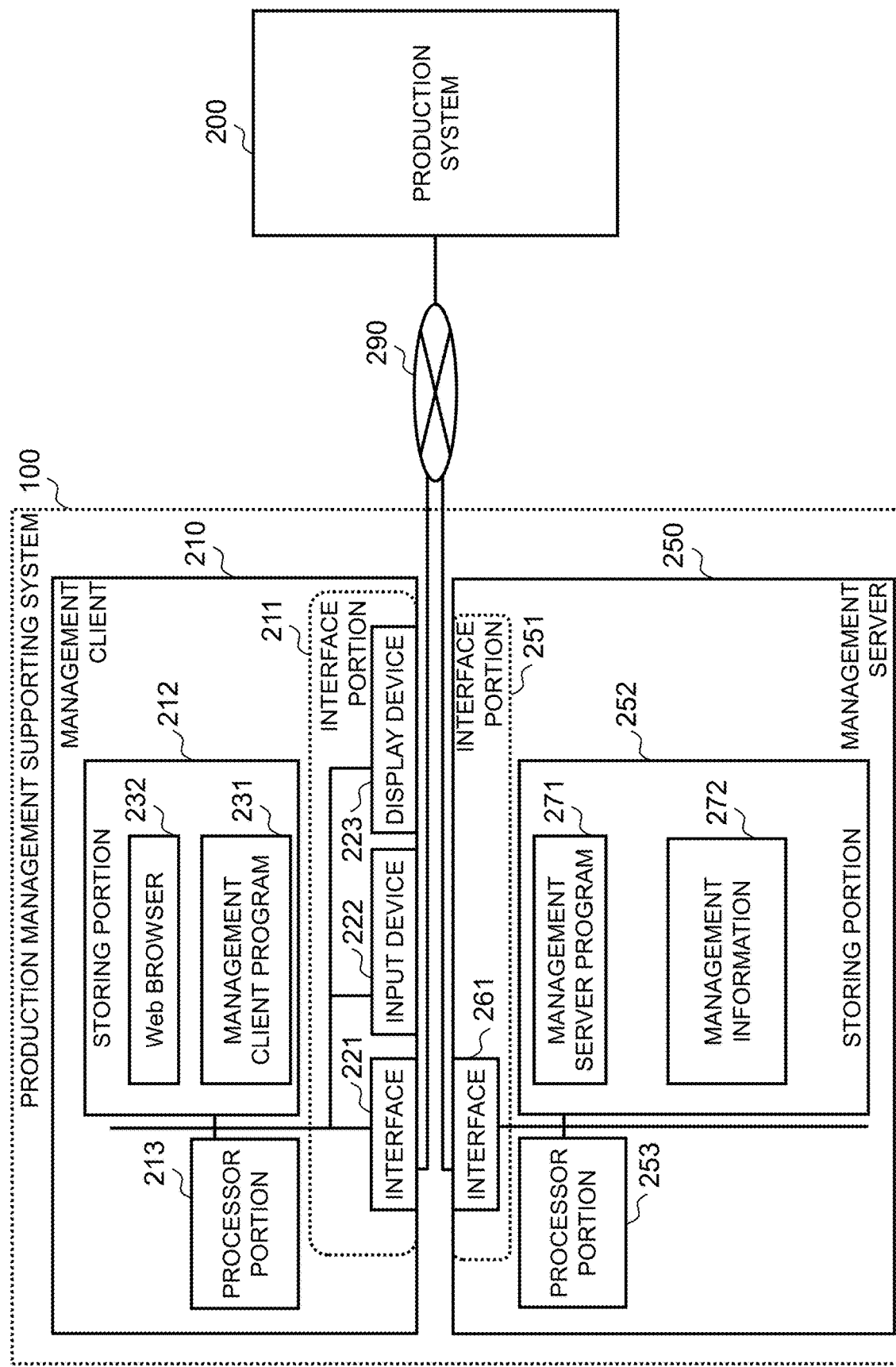
FIG. 2 shows a configuration of a production management supporting system according to the embodiment.

FIG. 2 shows a configuration of the production management supporting system 100.

The production management supporting system 100 includes a management server 250 and one or more management clients 210 coupled to the management server 250. To the management server 250, each of the management clients 210 and a production system 200 is coupled via a communication network (e.g., a local area network (LAN), a wide area network (WAN), or the Internet) 290.

The production system 200 is a production system (e.g., a factory) in which a plurality of different types of products are loaded and the sequential order of two or more of a plurality of steps is different depending on the product type, and is, for example, a job shop production system or a cell production system. The production system 200 includes a plurality of facilities (apparatuses) for a plurality of steps, a plurality of sensors which regularly perform measurement for a plurality of measurement items with regard to the plurality of steps, and a server which stores a plurality of measurement values regularly obtained using the plurality of sensors and transmits the plurality of measurement values to the management server 250. From the production system 200, information (raw data such as, e.g., production dynamic state data, facility data, and quality measurement data) is regularly or irregularly transmitted to the management server 250 and stored in the management server 250. For example, the information includes, for each product, a product ID, and the start time point and the end time point of each step. Note that the production system 200 may be a production system other than the production systems described above (e.g., a job shop production system or a cell production system), for example, a line production system.

The management client 210 has an I/F portion 211, a storing portion 212, and a processor portion 213 coupled to the I/F portion 211 and the storing portion 212.

The I/F portion 211 includes an I/F (communication interface device coupled to the communication network 290) 221, an input device (e.g., pointing device or keyboard) 222, and a display device (device having a physical screen which displays information) 223. A touch screen integrally including the input device 222 and the display device 223 may also be adopted.

The storing portion 212 stores a computer program executed by the processor portion 213 and information used by the processor portion 213. Specifically, for example, the storing portion 212 stores a management client program 231 and a Web browser 232. The management client program 231 communicates with the management server 250 and displays the UI such as the cost heat map 11 described above via the Web browser 232.

The management server 250 has an I/F portion 251, a storing portion 252, and a processor portion 253 coupled to the I/F portion 251 and the storing portion 252.

The I/F portion 251 includes an I/F (communication interface device coupled to the communication network 290) 261.

The storing portion 252 stores a computer program executed by the processor portion 253 and information used by the processor portion 253. Specifically, for example, the storing portion 252 stores a management server program 271 and management information 272. The management server program 271 communicates with the management client program 231. The management information 272 may include information related to a past record such as the start time point and the end time point of each of the steps for each product loaded in the production system 200. The management information 272 may include the raw data mentioned above. Also, the management information 272 may include, for example, information generated on the basis of a result of analyzing information related to a past record, and various thresholds.

Through a cooperative process performed by the management server program 271, the management client program 231, and the Web browser 232, the display of the UI such as the cost heat map 11 is implemented.

The relationships between the components shown in FIG. 2 and the components shown in FIG. 1 are, e.g., as follows. Specifically, of the I/F portions 211 and 251, at least the I/F portion 251 corresponds to the I/F portion 110. Of the storing portions 212 and 252, at least the storing portion 252 corresponds to the storing portion 120. Of the processor portions 213 and 253, at least the processor portion 253 corresponds to the processor portion 130. Of the management server program 271, the management client program 231, and the Web browser 232, at least the management server program 271 corresponds to the support program 150.

Figure 3:
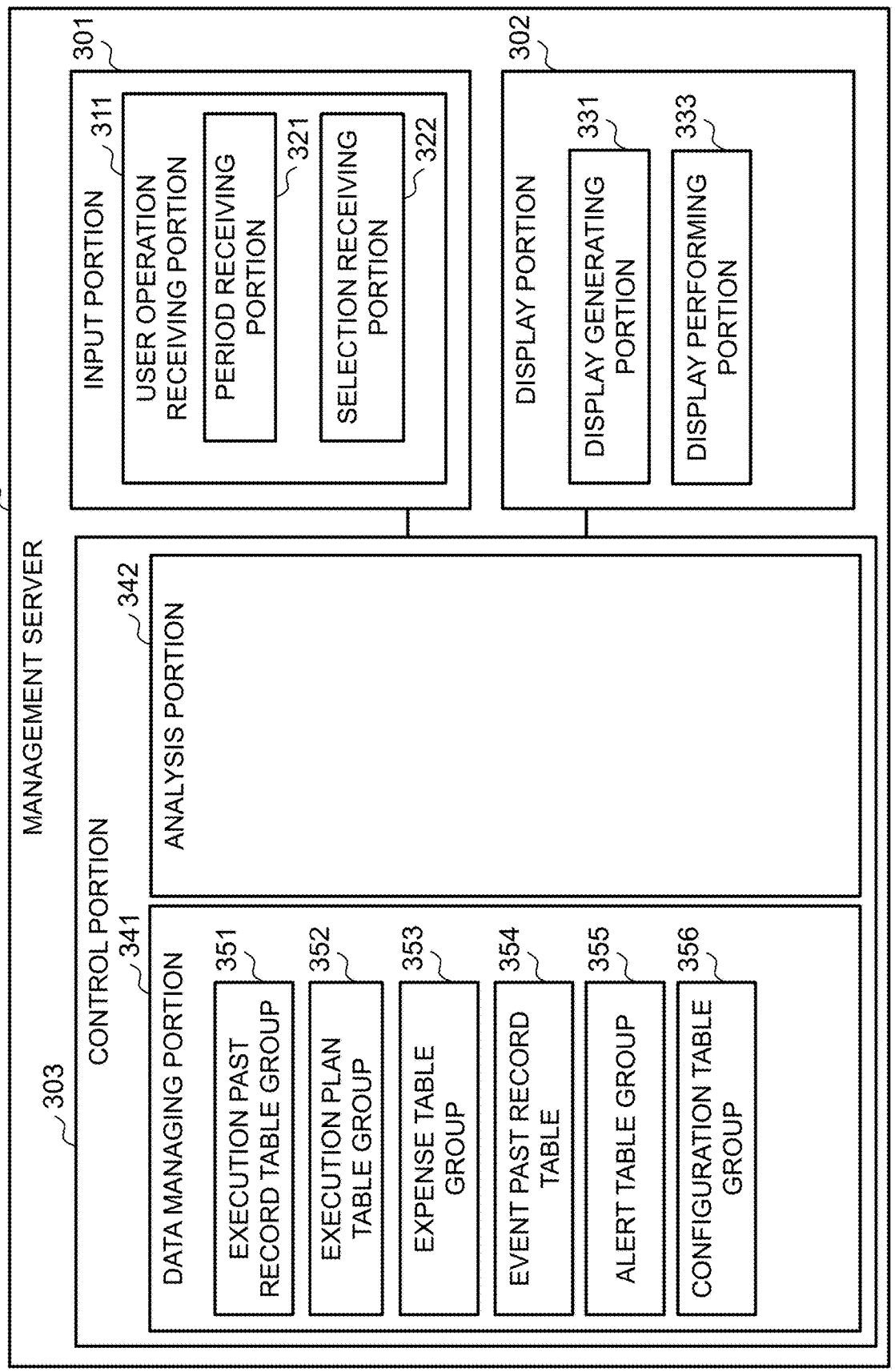
FIG. 3 shows an example of functions implemented in a management server.

FIG. 3 shows an example of the functions implemented in the management server 250.

The management server program 271 is executed by the processor portion 253 to allow the illustrated functions, i.e., an input portion 301, a display portion 302, and a control portion 303 to be implemented. In other words, the management server program 271 has the input portion 301, the display portion 302, and the control portion 303.

The input portion 301 is the function for receiving information. The input portion 301 includes a user operation receiving portion 311. The user operation receiving portion 311 is a function for receiving a user operation (operation performed on the UI by the user using the input device). The user operation receiving portion 311 includes a period receiving portion 321 and a selection receiving portion 322. The period receiving portion 321 is a function for receiving a specification of the display target period. The selection receiving portion 322 is a function for receiving the selection operation described above.

The display portion 302 is a function for displaying information. The display portion 302 includes a display generating portion 331 and a display performing portion 333. The display generating portion 331 is a function for generating the display of a UI (e.g., drawing it on a memory portion). The display performing portion 333 is a function for performing the display of the generated UI.

The control portion 303 is a function for control. The control portion 303 includes a data management portion 341 and an analysis portion 342.

The data management portion 341 manages information included in the management information 272, for example, the execution past record table group 351, the execution plan table group 352, the expense table group 353, an event past record table group 354, an alert table group 355, and a configuration table group 356. For example, the data management portion 341 acquires a past record data of a product, a worker, and a facility and updates at least a part of the management information 272 (e.g., the execution past record table group 351 and the event past record table group 354) on the basis of the past record data. Note that the "past record data" is data showing the past record of production and including, e.g., a product ID (e.g., product number), a step ID (e.g., step number), a time point (e.g., the collection time point of the data or the starting time point and the ending time point of the step), and a status (showing that, e.g., a process is currently performed in the step or the step was ended). For example, the data management portion 341 regularly or irregularly collects the past record data from the production system 200 and updates at least a portion of the management information 272.

The analysis portion 345 is a function for analyzing the management information 272.

The following will describe an example of a table included in the management information 272.

FIG. 4 shows an example of the execution past record table group 351.

The execution past record table group 351 includes a plurality of execution past record tables corresponding respectively to a plurality of resource types. In the present embodiment, the execution past record table group 351 includes a product past record table (an example of an execution past record table corresponding to Material) 401, a worker past record table (an example of an execution past record table corresponding to Man) 402, a facility past record table (an example of an execution past record table corresponding to Machine) 403, and a part past record table (an example of an execution past record table corresponding to Material) 404.

In the product past record table 401, each record stores information such as a product ID 411, a time point 412, a step ID 413, and a status 414. The product ID 411 indicates the ID of a product. The time point 412 indicates the execution time point (start time point or end time point of execution) of a step for the product. Also, the unit of time point is represented in a year/month/day/hour/minute/second unit, but the unit of a time point may be rougher or finer than the unit used in the present embodiment or may also be represented in a different unit. The step ID 413 indicates the ID of a step performed on the product. The status 414 indicates the status of the step performed on the product (e.g., "start" of the step or "end" of the step).

In the worker past record table 402, each record stores information such as a worker ID 421, a time point 422, a target product 423, a step ID 424, and a status 425. The worker ID 421 indicates the ID of a worker. The time point 422 indicates the execution time point of a step performed by the worker on a product. The target product 423 indicates the ID of the product on which the step is performed by the worker. The step ID 424 indicates the ID of the step performed by the worker. The status 425 indicates the status of the step performed on the product (e.g., "start" of the step or "end" of the step).

In the facility past record table 403, each record stores information such as a facility ID 431, a time point 432, a target product 433, a step ID 434, and a status 435. The facility ID 431 indicates the ID of a facility. The time point 432 indicates the execution time point of a step performed by the facility on a product. The target product 433 indicates the ID of the product on which the step is performed by the facility. The step ID 434 indicates the ID of the step performed by the facility. The status 425 indicates the status of the step performed on the product (e.g., "start" of the step or "end" of the step).

In the part past record table 404, each record stores information such as a part ID 441, a time point 442, a target product 443, a step ID 444, and a status 445. The part ID 441 indicates the ID of a part. The time point 442 indicates the execution time point of a step in which the part is mounted on a product. The target product 443 indicates the ID of the product on which the part is mounted. The step ID 444 indicates the ID of the step in which the mounting of the part is performed. The status 445 indicates the status of the step in which the mounting of the part is performed (e.g., "start" of the step or "end" of the step).

FIG. 5 shows an example of the execution plan table group 352.

The execution plan table group 352 includes a plurality of execution plan tables corresponding respectively to a plurality of resource types. In the present embodiment, the execution plan table group 352 includes a product plan table (an example of an execution plan table corresponding to Material) 501, a worker plan table (an example of an execution plan table corresponding to Man) 502, a facility plan table (an example of an execution plan table corresponding to Machine) 503, and a part plan table (an example of an execution plan table corresponding to Material) 504. The configurations of the tables 501 to 504 are the same as those of the tables 401 to 404, respectively. Specifically, information 511 to 514 included in each record of the table 501 is the same as the information 411 to 414 except that it is for a plan instead of a past record. Information 521 to 525 included in each record of the table 502 is the same as the information 421 to 425 except that it is for a plan instead of a past record. Information 531 to 535 included in each record of the table 503 is the same as the information 431 to 435 except that it is for a plan instead of a past record. Information 541 to 545 included in each record of the table 504 is the same as the information 441 to 445 except that it is for a plan instead of a past record.

FIG. 6 shows an example of the expense table group 353.

The expense table group 353 is, for example, a part expense table 601 and a worker expense table 602.

The part expense table 601 indicates, for each part, a cost price of the part (an example of an expense of the part). Specifically, the part expense table 601 has records for individual parts on a one-to-one basis. Each record stores information such as a part ID 611, a target product 612, and a cost price 613. The part ID 611 indicates the ID of a part. The target product 612 indicates the ID of a product on which the part is mounted. The cost price 613 indicates the cost price of the part.

The worker expense table 602 indicates, for each worker, a personnel expense of the worker per unit time (an example of an expense required for the worker's work). Specifically, the worker expense table 602 has, for example, records for individual workers on a one-to-one basis. Each record stores information such as a worker ID 621, a name 622, and personnel expenses 623. The worker ID 621 indicates the ID of a worker. The name 622 indicates the name of the worker. The personnel expenses 623 indicates the expenses of the worker per hour.

Note that, in the present embodiment, the "worker" is a human, but instead of or in addition to the human, an entity other than a human, for example, a machine such as a robot may be adopted as the worker. In this case, the personnel expenses 623 may be determined as expenses per unit time based on the expenses of an entity (e.g., a machine), a maintenance cost, an expected operation date, and the like. Also, when the worker is an entity other than a human, Man may be not given, and the entity may be considered as a part of Machine such as a facility.

FIG. 7 shows an example of the event past record table group 354.

The event past record table group 354 includes one or more event tables corresponding respectively to one or more resource types other than Money. In the present embodiment, the event past record table group 354 includes a product event table (an example of an event past record table corresponding to Material) 701, a worker event table (an example of event past record table corresponding to Man) 702, a facility event table (an example of an event past record table corresponding to Machine) 703, and a part event table (an example of an event past record table corresponding to Material) 704.

The product event table 701 indicates an event that has occurred for each product. In the product event table 701, each record stores information such as a product ID 711, a time point 712, a step ID 713, and an event 714. The product ID 711 indicates the ID of a product. The time point 712 indicates the occurrence time point of an event that occurred in a step for the product (e.g., the start time point or end time point of the event). The step ID 713 indicates the ID of the step. The event 714 indicates the content of the event (e.g., outline or type).

The worker event table 702 indicates an event that has occurred for each worker. In the worker event table 702, each record stores information such as a worker ID 721, a time point 722, a target product 723, a step ID 724, and an event 725. The worker ID 721 indicates the ID of a worker. The time point 722 indicates the occurrence time point of an event of the worker that occurred in a step performed by the worker on a product. The target product 723 indicates the ID of the product. The step ID 724 indicates the ID of the step. The event 725 indicates the content of the event.

The facility event table 703 indicates an event that has occurred in each facility. In the facility event table 703, each record stores information such as a facility ID 731, a time point 732, a target product 733, a step ID 734, and an event 735. The facility ID 731 indicates the ID of a facility. The time point 732 indicates the occurrence time point of an event of the facility that occurred in a step performed by the facility on a product. The target product 733 indicates the ID of the product. The step ID 734 indicates the ID of the step. The event 735 indicates the content of the event.

The part event table 704 indicates an event that has occurred for each part. In the part event table 704, each record stores information such as a part ID 741, a time point 742, a target product 743, a step ID 744, and an event 745. The part ID 741 indicates the ID of a part. The time point 742 indicates the occurrence time point of an event of the part that occurred in a step in which the part is mounted on a product. The target product 743 indicates the ID of the product. The step ID 744 indicates the ID of the step. The event 745 indicates the content of the event.

At least some information in one or more records of the event past record table group 354 may be additional or modified information according to information manually input by a user or may be additional or modified information based on the raw data described above. Also, for at least one resource type, for at least one event, information for specifying a period during which the event occurred (e.g., the start time point and end time point of the event) instead of the occurrence time of the event may be stored in the event past record table.

FIG. 8 shows an example of the alert table group 355.

The alert table group 355 includes one or more alert tables corresponding respectively to one or more resource types other than Money. In the present embodiment, the alert table group 355 includes a product alert table (an example of an alert table corresponding to Material) 801, a worker alert table (an example of an alert table corresponding to Man) 802, a facility alert table (an example of an alert table corresponding to Machine) 803, and a part alert table (an example of an alert table corresponding to Material) 804.

The product alert table 801 indicates relationships between product events and alert levels. In the product alert table 801, each record stores information such as an event 811, an alert ID 812, a product alert level 813, and a product/cost perspective alert level 814. The event 811 indicates an event of a product. The alert ID 812 indicates the ID of an alert corresponding to the event. The product alert level 813 indicates a product alert level (an alert level in product perspective (importance of the alert)) associated with the alert. The product/cost perspective alert level 814 indicates the product/cost perspective alert level associated with the alert (an alert level determined in cost perspective in addition to product perspective). Note that the product/cost perspective alert level 814 may not be given, and in that case, the product alert level 813 may be appropriately replaced with the alert level determined in cost perspective in addition to product perspective.

The worker alert table 802 indicates relationships between worker events and alert levels. In the worker alert table 802, each record stores information such as an event 821, an alert ID 822, a worker alert level 823, and a worker/cost perspective alert level 824. The event 821 indicates an event of a worker. The alert ID 822 indicates the ID of an alert corresponding to the event. The worker alert level 823 indicates a worker alert level (an alert level in worker perspective) associated with the alert. The worker/cost perspective alert level 824 indicates the worker/cost perspective alert level associated with the alert (an alert level determined in cost perspective in addition to worker perspective). Note that the worker/cost perspective alert level 824 may not be given, and in that case, the worker alert level 823 may be appropriately replaced with the alert level determined in cost perspective in addition to worker perspective.

The facility alert table 803 represents relationships between facility events and alert levels. In the facility alert table 803, each record stores information such as an event 831, an alert ID 832, a facility alert level 833, and a facility/cost perspective alert level 834. The event 831 indicates an event of a facility. The alert ID 832 indicates the ID of an alert corresponding to the event. The facility alert level 833 indicates a facility alert level (an alert level in facility perspective) associated with the alert. The facility/cost perspective alert level 834 indicates the facility/cost perspective alert level associated with the alert (an alert level determined in cost perspective in addition to facility perspective). Note that the facility/cost perspective alert level 834 may not be given, and in that case, the facility alert level 833 may be appropriately replaced with the alert level determined in cost perspective in addition to facility perspective.

The part alert table 804 indicates relationships between part events and alert levels. In the part alert table 804, each record stores information such as an event 841, an alert ID 842, a part alert level 843, and a part/cost perspective alert level 844. The event 841 indicates an event of a part. The alert ID 842 indicates the ID of an alert corresponding to the event. The part alert level 843 indicates a part alert level (an alert level in part perspective) associated with the alert. The part/cost perspective alert level 844 indicates the part/cost perspective alert level associated with the alert (an alert level determined in cost perspective in addition to part perspective). Note that the part/cost perspective alert level 844 may not be given, and in that case, the part alert level 843 may be appropriately replaced with the alert level determined in cost perspective in addition to part perspective.

FIG. 9 shows an example of the configuration table group 356.

The configuration table group 356 indicates relationships between production types, products, and steps, and tree structures of a plurality of management units. The configuration table group 356 is, for example, a production type table 901, a line table 902, a factory table 903, and a site table 904. The production type table 901 indicates relationships between production types, products, and steps. The line table 902, the factory table 903, and the site table 904 indicates tree structures of a plurality of management units.

In the production type table 901, each record stores information such as a production type ID 911, a line ID 912, and a product ID 913. The production type ID 911 indicates the ID of a production type. The line ID 912 indicates the ID of a line through which a product belonging to the production type passes. The item ID 913 is a list of IDs of products belonging to the production type.

The line table 902 indicates relationships between lines and steps. In the line table 902, each record stores information such as a line ID 921 and a step ID 922. The line ID 921 indicates the ID of a line. The step ID 922 indicates a list of IDs of a plurality of steps forming the line and the sequential order of the steps.

The factory table 903 indicates relationships between factories and lines. In the factory table 903, each record stores information such as a factory ID 931 and a line ID 932. The factory ID 931 indicates the ID of a factory. The line ID 932 indicates a list of IDs of one or more lines of the factory.

The site table 904 indicates relationships between sites and factories. In the site table 904, each record stores information such as a site ID 941 and a factory ID 942. The site ID 941 indicates the ID of a site. The factory ID 942 indicates a list of IDs of one or more factories belonging to the site.

Based on the table groups 351 to 356 as described above, the management server program 271 performs the cost calculation process, generates the cost heat map 11, and performs alert display control.

An example of the cost calculation process is as follows.

Costs are calculated for each product. For a product, the costs are based on a labor cost (e.g., a direct labor cost) and a material cost (e.g., a direct material cost). The labor cost is based on a product of personnel expenses (costs per unit time) and a work time. The material cost is based on cost prices of parts. The labor cost and the material cost are factors that greatly affect the costs and are easily adjusted. In addition to generating and displaying the cost heat map 11, calculating costs that affect the display of the cost heat map 11 based on the labor cost and the material cost also contributes to the support for Money management. In the present embodiment, costs are simply modeled as a sum of labor cost and material cost.

An example of calculation of a labor cost and a material cost for one product A is as shown in FIG. 10. Specifically, the labor cost and the material cost increase with time, and become the highest when the last step passes. In the present embodiment, costs (labor cost and material cost) at each time point are calculated.

The labor cost of product A is a sum of work costs of steps 1 to 4. For each step, the work cost is a sum of one or more work charges corresponding respectively to one or more workers involved in the step. For each worker, the work charge is a product of the work time and the labor cost. For example, when a worker involved in step 1 is only worker A and the labor cost of worker A is 600 per hour, step 1 is 10 minutes (12:30 to 12:40), so the work charge of step 1 is 600×⅙=100. For each step, the work cost increases linearly with time.

The material cost of product A is a sum of the cost prices of parts mounted on product A. When a part is mounted in a step, the cost price of the part is added to the material cost of product A for the time block of the step. Therefore, the material cost of product A increases stepwise with time.

Note that a defect of part X mounted on product A in a step may be detected and then part X may be replaced, and however, in that case, it may be considered that two parts X have been consumed and then the material cost may be increased in multiple stages in the same step or the material cost may be unchanged. It is considered that the labor cost will increase because the work time becomes longer as part X is replaced.

For product A, an actual cost and a planned cost are calculated on a per step basis. For each step, the actual cost is calculated based on an execution time block, a worker and a part that are specified for product A and the step from the execution past record table group 351, and based on personnel expenses and a cost price that are specified for the worker and the part from the expense table group 353. For each step, the planned cost is calculated based on a planned time block, a worker and a part that are specified for product A and the step from the execution plan table group 352, and based on personnel expenses and a cost price that are specified for the worker and the part from the expense table group 353. Note that the planned cost for each step may be predetermined in place of such a method, or an expense table for calculating the planned cost (e.g., a table in which average personnel expenses of workers are registered) may be prepared to calculate the planned cost based on such an expense table.

Then, for product A, a differential cost is calculated on a per step basis. The differential cost is a value obtained by subtracting the planned cost from the actual cost. According to the example shown in FIG. 11, for product A, a differential cost is calculated for each of steps 1 to 4.

In this way, the differential cost is calculated for each product on a per step basis. According to the example shown in FIG. 11, also for product B, a differential cost is calculated for each of steps 1 to 4.

For each product, a differential cost is calculated on a per step basis. The differential cost means an amount of excess of cost. Therefore, the greater the differential cost, the greater the excess of cost. The cost chart showing a cost for each step based on the result of the cost calculation process may be a chart showing the actual cost in each time point. However, a chart showing a differential cost in each time point allows the user to easily determine the suitability of the costs from a higher perspective. Therefore, in the present embodiment, the cost chart is a chart showing a differential cost for each time point.

Figure 12:
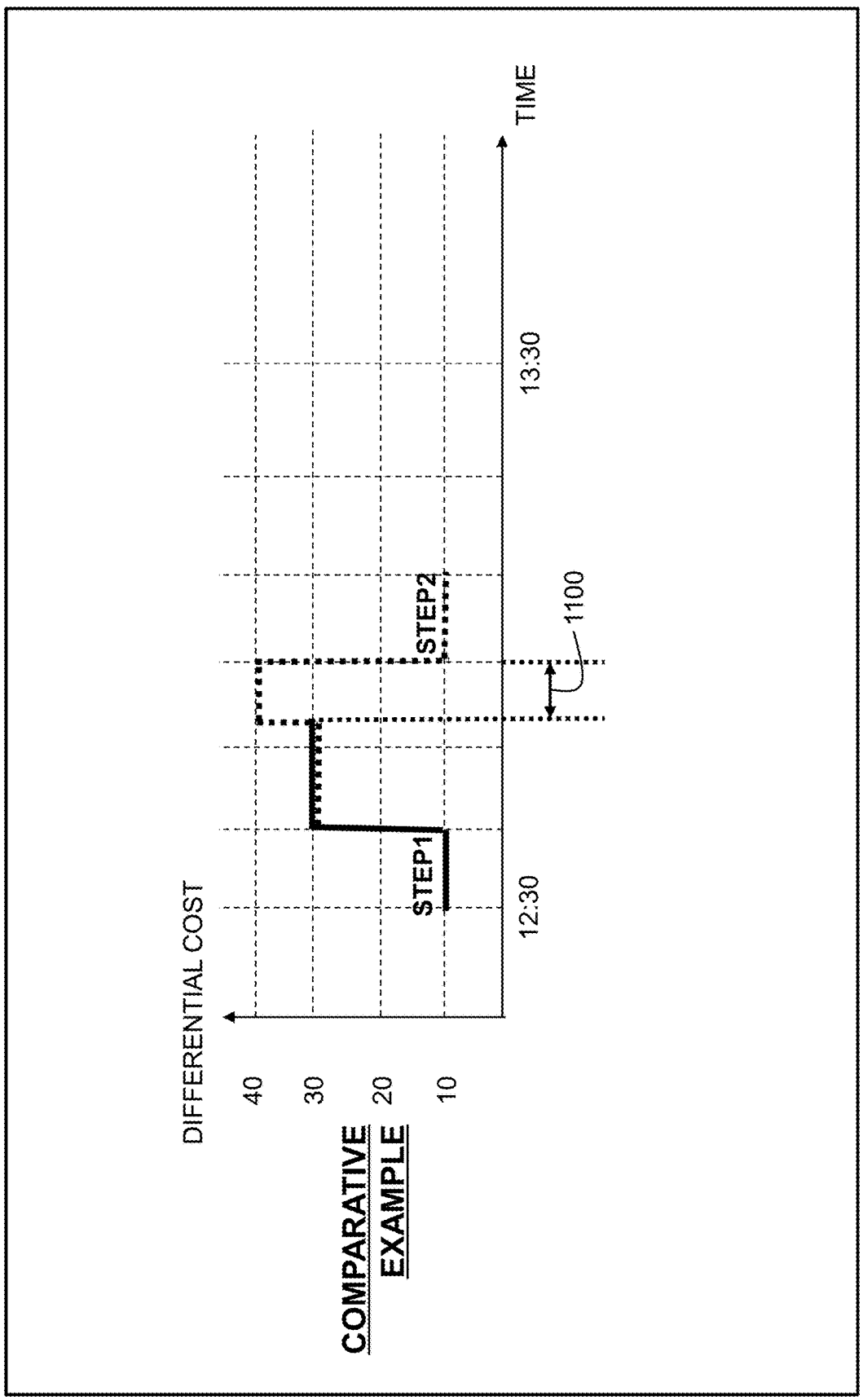
FIG. 12 shows the concept of a cost chart according to a comparative example.

An example of the cost chart displaying the differential cost can be a cost chart according to a comparative example illustrated in FIG. 12. In the comparative example, a chart having a time axis and a differential cost axis (axis corresponding to the differential cost) perpendicular to the time axis is adopted. On the chart, a line in which a differential cost at each time point is plotted is generated on a per step basis. For each step, the differential cost at each time point is a sum of one or more differential costs calculated for the step for one or more products to which the execution time block belongs at that time point. In the example shown in FIG. 12, the line corresponding to step 1 shows the sum of the differential costs in step 1 for product A and the differential costs in step 1 for product B. The line corresponding to step 2 shows the sum of the differential costs in step 2 for product A and the differential costs in step 2 for product B.

Figure 11:
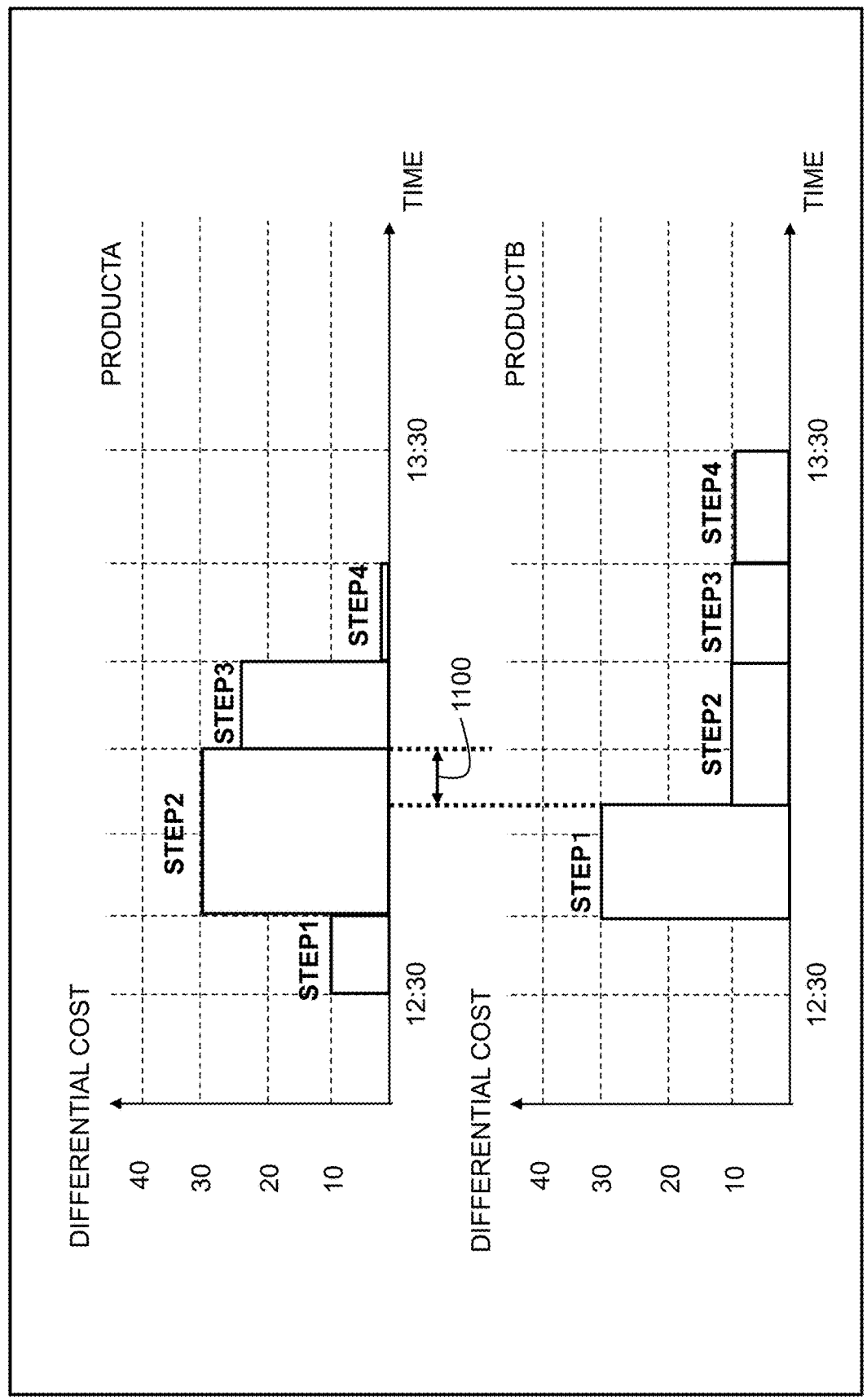
FIG. 11 shows an example of time and differential costs for each of two products.

For step 2, in FIG. 11, there is a partially overlapping execution time block 1100 for product A and product B. Therefore, in FIG. 12, the differential cost in the time block 1100 is "40" that is a sum of a differential cost of "30" for product A and a differential cost of "10" for product B.

As described above, in the comparative example, a line showing a differential cost at each time point is drawn on a per step basis. However, the line to be drawn is complicated as the number of products for which the same step is performed in the same time block increases, and the possibility that lines are overlapped increases as the number of steps increases. As a result, the visibility decreases, and it is difficult to intuitively determine the suitability of the differential costs.

Figure 13:
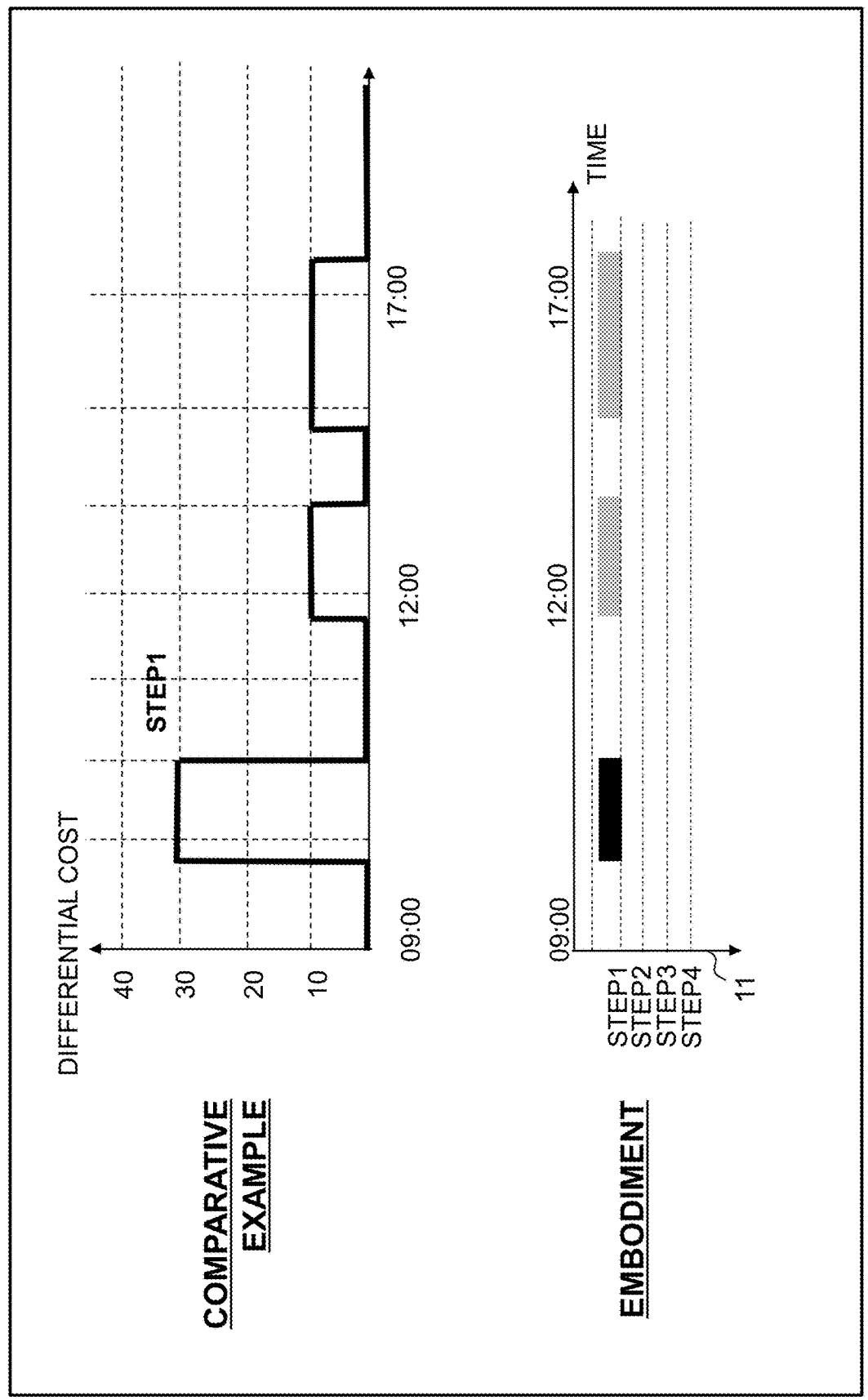
FIG. 13 shows an example of comparison between the cost chart according to a comparative example and a cost heat map according to the embodiment.

Therefore, in the present embodiment, as illustrated in FIG. 13, the cost heat map 11 is adopted as the cost chart. The management server program 271 generates the cost heat map 11 based on the result of the cost calculation process as described above. In the example shown in FIG. 13, the cost heat map 11 has a step axis (an example of the management unit axis) as an axis perpendicular to the time axis. The magnitude of the differential cost is expressed by shading (an example of a difference in display mode). In other words, a simple 3D chart with time, step, and cost is adopted. Although it is considered to adopt a 3D chart having a time axis, a step axis, and a differential cost axis, the cost heat map 11 is preferably used as a chart for allowing the user to determine the suitability of the costs from a higher perspective. This is because such a chart has high visibility. The cost heat map 11 has band-like regions each extending in parallel with the time axis for each step. Of the band-like regions, a range corresponding to a time block in which a differential cost as an excess of cost occurs is highlighted. The degree of accentuation (e.g., a density) depends on the magnitude of the differential cost.

The management server program 271 compares the differential cost with threshold value of 1 or more, and determines, depending on whether the differential cost is at any of threshold values or more, the display density (an example of the degree of accentuation) of the range corresponding to the time block in which the differential cost occurs. In the example shown in FIG. 13, the density showing the magnitude of the differential cost has two levels. The density of the range corresponding to the time block in which the differential cost is equal to or larger than "30" (an example of a first threshold value) is a first density. The density of the range corresponding to the time block in which the differential cost is smaller than "30" and equal to or larger than "10" (an example of the second threshold that is equal to or smaller than the first threshold) is a second density lower than the first density. In other words, the higher the density, the greater the differential cost. The density may be represented in three or more levels. Also, as the difference in display mode depending on the magnitude of the differential cost, instead of or in addition to the difference in shading, another type of difference in display mode such as a difference in color or pattern may be adopted.

As described above, the cost calculation process performed by the management server program 271 includes, for each product:

(A) Specifying, from the execution past record table group 351, two or more steps performed for production of the product, for each of the two or more steps, one or more resources (in the present embodiment, worker and part) involved in the step, and the execution time block of the step;

(B) Specifying, for each of the two or more specified steps, one or more expenses related to the specified one or more resources from the expense table group 353; and (C) Calculating, for each of the specified two or more steps, costs (differential costs in the present embodiment) based on the specified one or more expenses. Also, the cost calculation process further includes calculating, for each step, for each time point, when there are one or more products to which the time point belongs in the execution time block of the step, costs (differential costs in the present embodiment) based on one or more costs calculated for the step for the one or more products. In this way, it is possible to appropriately calculate the costs for each time point based on the expense table group 353 prepared for the execution past record table group 351.

Also, the user can easily determine, from the cost heat map 11, what amount of excess of cost occurs at which time point in which step.

Figure 14:
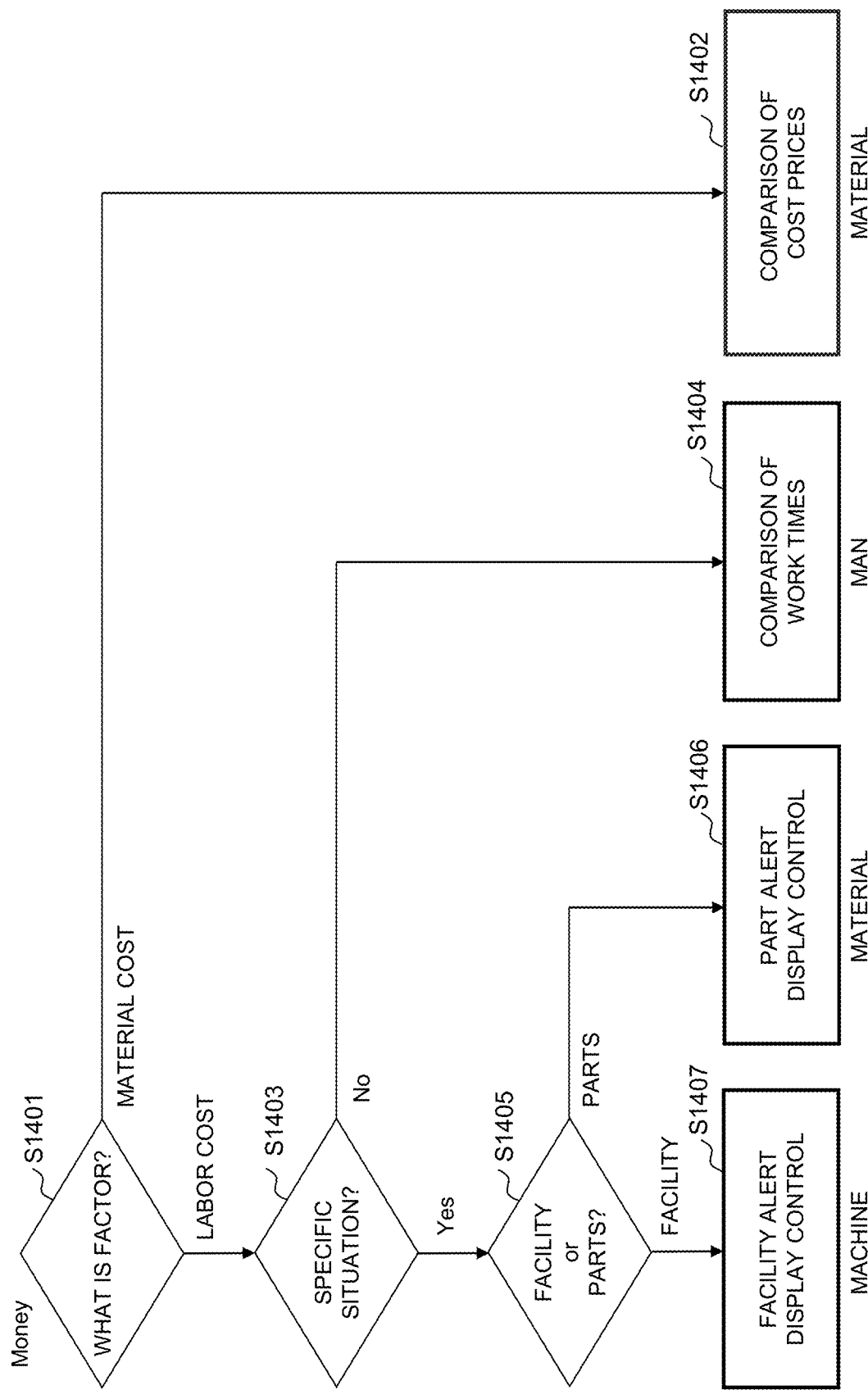
FIG. 14 shows an example of the flow of a cost improvement support process.

A cost improvement support process (process for supporting improvement of costs) illustrated in FIG. 14 may be performed.

Specifically, the management server program 271 (and/or the user) determines whether the factor of an excess of cost is labor cost or material cost (S1401). This determination may be performed as follows, for example. Note that the "excess of cost" is a differential cost that is equal to or larger than at least one threshold value. For the description of FIG. 14, the differential cost is referred to as the "target differential cost". A time block in which the target differential cost has incurred is referred to as the "target time block". A step in which the target differential cost has incurred is referred to as the "target step".

The management server program 271 (and/or the user) specifies the labor cost and the material cost that constitute the actual cost that is a base of the target differential cost.

The management server program 271 (and/or the user) determines which of the specified labor cost and material cost satisfies a factor condition. The "factor condition" is a condition that it corresponds to the factor of an excess of cost. The factor condition may adopt, for example, it being at least one of the higher of the labor cost and the material cost, the ratio of the labor cost being a predetermined threshold value or more, and the ratio of the material cost being a certain threshold value or more.

When the material cost is a factor, the management server program 271 compares a sum of actual cost prices and a sum of planned cost prices for each of one or more products for which the target step has been performed in the target time block (S1402). The sum of actual cost prices is a sum of one or more cost prices specified from the part expense table 601 for one or more parts specified from the part past record table 404. The sum of planned cost prices is a sum of one or more cost prices specified from the part expense table 601 for one or more parts specified from the part plan table 504. When there are products in which a difference in sum of cost prices exceeds a predetermined value, the management server program 271 may generate a report indicating the target step and the products to output (e.g., display or transmit to the administrator) the report.

When the labor cost is a factor, S1403 and the subsequent steps may be performed.

Specifically, the management server program 271 determines, based on the facility event table 703 and the part event table 704, whether or not a specific situation has occurred with respect to any of facility and part for the target time block and the target step (S1403). The "specific situation" is a situation that corresponds to a predefined situation, and may be, as an example of an event, a situation such as "abnormal" or "work delay", or a different situation from a planned situation such as a "normal" or "planned stop".

When the determination result of S1403 is false, the management server program 271 compares the actual work time and the planned work time for each of one or more workers involved in the target step in the target time block (S1404). This is because since the specific situation does not occur, the factor of the increased labor cost is considered that there is a high possibility that the actual work time of the worker is longer than the planned work time. The actual work time is a work time specified from the worker past record table 402. The planned work time is a work time specified from the worker plan table 502. When there are workers for which a difference in work time exceeds a predetermined value, the management server program 271 may generate a report on the workers (e.g., a report including at least some of the information of records as past records of the workers and the information of records as plans of the workers) to output (e.g., display or transmit to the administrator) the report.

When the determination result of S1403 is true, the management server program 271 determines which of the facility and the part in which the specific situation has occurred (S1405). When the specific situation has occurred for both the facility and the part, both S1406 and S1407 described below may be performed, or a process for the specific situation of the facility or the part determined according to a predetermined policy (S1406 or S1407) may be performed.

When there is a specific situation on a part, the management server program 271 determines whether or not to display, for the target part in the specific situation, an alert object at a position corresponding to the occurrence time point of the specific situation in the band-like region corresponding to the target step according to a part/cost perspective alert level indicated in the part event table 704 (S1406). For example, the management server program 271 displays the alert object when the part/cost perspective alert level is equal to or larger than a predetermined level. When the alert object is specified by the user, the management server program 271 may display information associated with the alert object (e.g., the content of the specific situation, information on the part).

When there is an event on a facility, the management server program 271 determines whether or not to display, for the target part in the specific situation, an alert object at a position corresponding to the occurrence time point of the specific situation in the band-like region corresponding to the target step according to a facility/cost perspective alert level indicated in the facility event table 703 (S1407). For example, the management server program 271 displays the alert object when the facility/cost perspective alert level is equal to or larger than a predetermined level. When the alert object is specified by the user, the management server program 271 may display information associated with the alert object (e.g., the content of the specific situation, information on the facility).

According to each of S1402, S1404, S1406, and S1407, the user can specify the factor of the increased costs from the displayed report or alert object, and can consider measures for improvement of the costs.

In at least one of S1402, S1404, S1406, and S1407 (and/or in a process different from the process of FIG. 14), alert display controls as described with reference to FIGS. 15 to 18 may be performed. In the present embodiment, the "alert" may be a narrow alert such as a warning, but in the present embodiment, the "alert" is a broad alert such as a recommendation or a notification.

Hereinafter, some examples of alert display control will be described.

Figure 15:
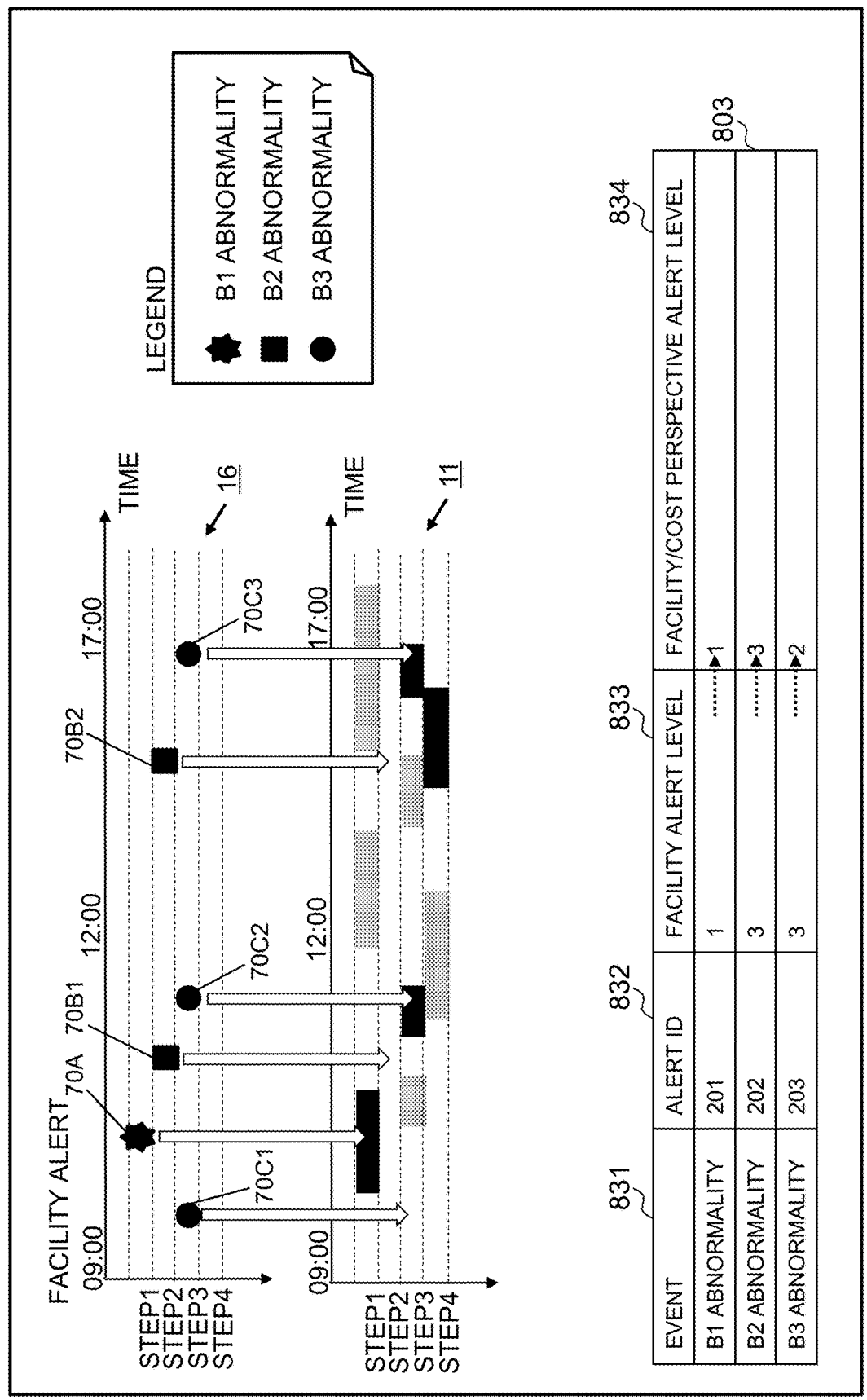
FIG. 15 shows a first example of an alert display control.
Figure 16:
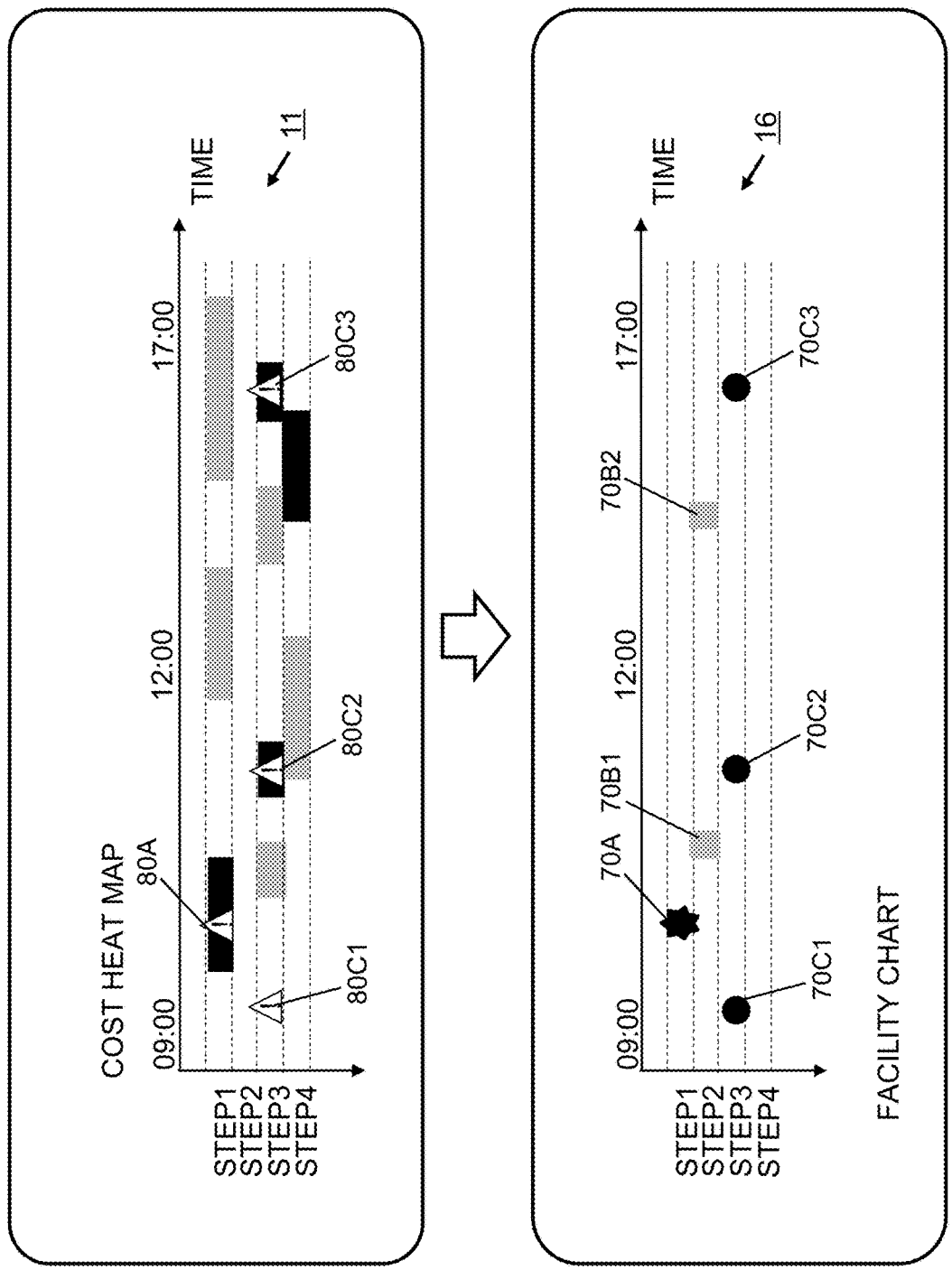
FIG. 16 shows the first example of the alert display control.

With reference to FIGS. 15 and 16, facility (an example of Machine) is taken as an example of a resource type. Note that in the description of the alert display control, the description about the facility is applicable to product (an example of Material) or part (an example of Material).

The facility alert level is associated in advance for each specific situation. When the management server program 271 detects that a specific situation has occurred with respect to a facility, the management server program 271 displays an alert object for the alert corresponding to the specific situation based on the facility alert level of the alert. For example, the management server program 271 can control the display mode of the alert object according to the facility alert level, or can hide the alert object of the alert whose facility alert level is smaller than a certain level.

However, when multiple specific situations occur with respect to the facility, multiple alert objects may be displayed. For example, as illustrated in FIG. 15, a plurality of alert objects 70 are displayed on a facility chart 16 which is a chart for facility having a time axis and a step axis.

Not all of multiple specific situations affect the excess of cost. In the example shown in FIG. 15, specific situations corresponding to alert objects 70B1, 70B2, and 70C1 do not affect the excess of cost.

Therefore, in the present embodiment, the management server program 271 filters the alert objects 70 in cost perspective when displaying the cost heat map 11. In other words, the "alert display control" includes filtering alert objects to be displayed on the cost heat map 11. Specifically, for example, the management server program 271 determines whether or not to display an alert object on the cost heat map for the specific situation, based on the following relationships (X) to (Z):

(X) One of the following (x1) and (x2):
(x1) One or more time points when the same one or more specific situations occurred, and
(x2) A relationship between an actual time and a planned time, and an actual time block for a resource in which the specific situation has occurred;
(Y) For each of one or more differential costs, the magnitude of the differential cost; and
(Z) For each of one or more differential costs, the time block in which the differential cost has incurred.

An example of alert display control based on the relationships (x1), (Y), and (Z) is included in a first example. For example, the management server program 271 determines, for each specific situation, whether or not a ratio (hereinafter, an actual ratio) that an excess of cost (a differential cost equal to or larger than a predetermined magnitude) has incurred at one or more time points when the same one or more specific situations occurred is equal to or larger than a predetermined ratio. When the determination result is true, the management server program 271 displays an alert object on the cost heat map 11 for all of the same one or more specific situations. On the other hand, when the determination result is false, the management server program 271 does not display an alert object on the cost heat map 11 for all of the same one or more specific situations. In the example shown in FIG. 15, it is as follows. Note that each of events "B1 abnormality", "B2 abnormality", and "B3 abnormality"

is an example of the specific situation. Further, the predetermined ratio is 2/3 in the following cases.

One event of "B1 abnormality" has occurred. Since an excess of cost has incurred at the occurrence time point of the event "B1 abnormality", the determination result is true. Therefore, the management server program 271 determines to display an alert object corresponding to the alert object 70A for the event "B1 abnormal" on the cost heat map 11.

Two events of "B2 abnormality" have occurred. No excess cost has incurred at either of the occurrence time points of the events of "B2 abnormality". Accordingly, the actual ratio is 0/2, which is smaller than the predetermined ratio 2/3. Therefore, the determination result is false. Accordingly, the management server program 271 determines not to display corresponding alert objects for both the alert objects 70B1 and 70B2 for the event "B2 abnormality" on the cost heat map 11. As a result, even when there is the event "B2 abnormality" that affects excess of cost, no alert object is displayed on the cost heat map 11 for the event "B2 abnormality".

Three events of "B3 abnormality" have occurred. No excess of cost has incurred at the occurrence time point of one event "B3 abnormality", while an excess of cost has incurred at the occurrence time point of each of the remaining two events of "B2 abnormal". Accordingly, the actual ratio is 2/3, which is equal to or larger than the predetermined ratio 2/3. Therefore, the determination result is true. Accordingly, the management server program 271 determines to display alert objects corresponding respectively to the alert objects 70C1 to 70C3 for the event "B3 abnormality" on the cost heat map 11. As a result, even when there is the event "B3 abnormality" that does not affect excess of cost, an alert object corresponding to the alert object 70C1 for the event "B3 abnormality" is displayed on the cost heat map 11.

As a result of such filtering, the display of the cost heat map 11 is as illustrated in FIG. 16. Specifically, the cost heat map 11 displays an alert object 80A corresponding to the alert object 70A for the event "B1 abnormality" and alert objects 80C1 to 80C3 corresponding respectively to the alert objects 70C1 to 70C3 for the event "B3 abnormality". For example, the user sees that the alert object 80C1 is displayed at a place where no excess of cost appears, estimates that the planned cost has been overestimated too much, and thus no excess of cost has incurred, so that the user can consider as to whether planning of the costs and the actual costs are to be revised.

The alert display control includes, in addition to filtering alert objects to be displayed on the cost heat map 11, determining an alert level in cost perspective. Specifically, for example, the management server program 271 associates, for a resource type of the resource in which the specific situation has occurred, a new alert level determined in additional cost perspective with respect to the resource type with the specific situation, based on the alert level associated with the specific situation, in addition to the relationships (X) to (Z).

More specifically, for example, the management server program 271 may determine, based on the result of the above-described determination based on the relationships (X) to (Z) (e.g., the determination as to whether or not, for each specific situation, the ratio that an excess of cost has incurred at one or more time points when the same one or more specific situations occurred is equal to or larger than a predetermined ratio), an alert level that is the same as or different from the alert level associated with the specific situation to be a new alert level determined in additional cost perspective.

For example, when the determination result is true and the alert level is equal to or larger than a predetermined value, an alert level that is the same as that alert level may be determined to be a new alert level. When the determination result is true and the alert level is smaller than the predetermined value, an alert level that is higher than that alert level may be determined to be a new alert level. On the other hand, for example, when the determination result is false and the alert level is smaller than the predetermined value, an alert level that is the same as that alert level may be determined to be a new alert level. When the determination result is false and the alert level is equal to or larger than the predetermined value, an alert level that is lower than that alert level may be determined to be a new alert level. How high or low the new alert level is as compared with the alert level may be determined in advance or may be determined according to a difference between the actual ratio and the predetermined ratio.

In the example shown in FIG. 15, it is as follows. Note that the "predetermined value" for the alert level is "2" in the following example.

For the event "B1 abnormality", the result of the above determination is true, and the facility alert level is "2" or higher (the highest "1"). Therefore, the facility/cost perspective alert level is set to "1", which is the same as the facility alert level.

For the event "B2 abnormality", the result of the above determination is false, and the facility alert level is lower than "2" (the lowest "3"). Therefore, the facility/cost perspective alert level is set to "3", which is the same as the facility alert level.

For the event "B3 abnormality", the result of the above determination is true, and the facility alert level is lower than "2". Therefore, the facility/cost perspective alert level is set to "2", which is higher than the facility alert level "3".

As illustrated in FIG. 16, the management server program 271 displays one or more alert objects 80 on the cost heat map 11, and when any one of the one or more alert objects 80 is specified, the management server program 271 displays a facility chart 16 that is a chart for the facility (an example of the target resource type) which is the resource type corresponding to the specified alert object 80. The facility chart 16 may be displayed instead of the cost heat map 11, or may be displayed adjacent to the cost heat map 11 (e.g., arranged in the direction perpendicular to the time axis). The facility chart 16 displayed at this time may be a chart with a time axis and a step axis whose scales are the same as those of the time axis and step axis of the cost heat map 11, respectively. This makes it easy to recognize the correspondence between the steps, the time points, and the alert objects.

The facility/cost perspective alert level (an example of the new alert level determined in additional cost perspective) is used to determine the display mode of the alert object 70 on the facility chart 16 to be displayed when any one of the alert objects 80 on the cost heat map 11 is specified as shown in FIG. 16. Specifically, for example, the alert objects 70A and 70C1 to 70C3 corresponding to the facility/cost perspective alert levels that is equal to or higher than the predetermined value "2" is accentuated as compared with the alert objects 70B1 and 70B2 corresponding to the facility/cost perspective alert levels that are lower than the predetermined value "2". As a result, the user can recognize, from the facility chart 16, that there is a specific situation (specific situation for facility) for which the alert object 80 is not displayed on the cost heat map 11, and confirm the specific situation for facility while maintaining the cost perspective (e.g., a perspective of whether or not there is an impact on excess of cost).

An example of alert display control based on the relationships (x2), (Y), and (Z) is included in a second example.

Figure 17:
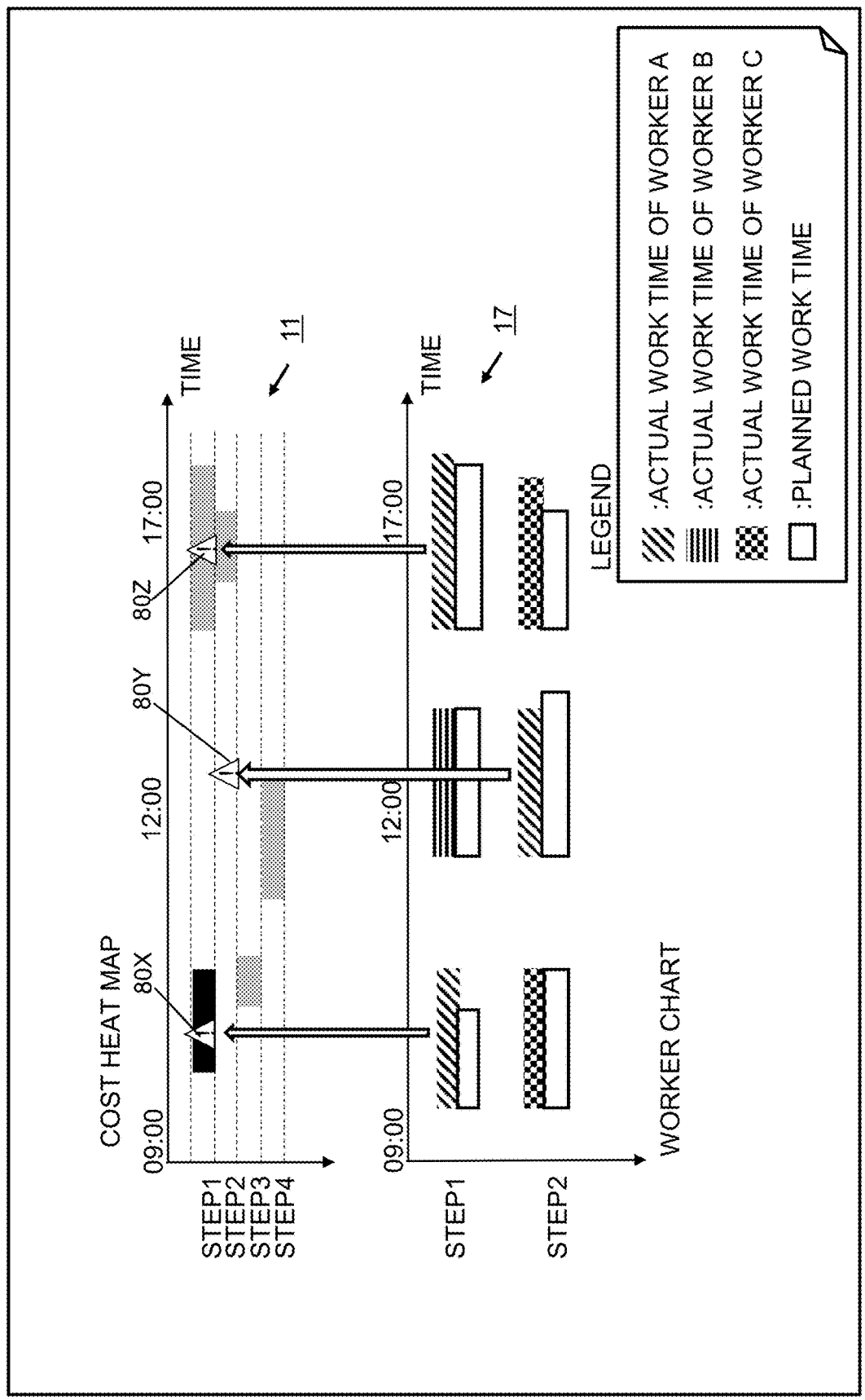
FIG. 17 shows a second example of the alert display control.
Figure 18:
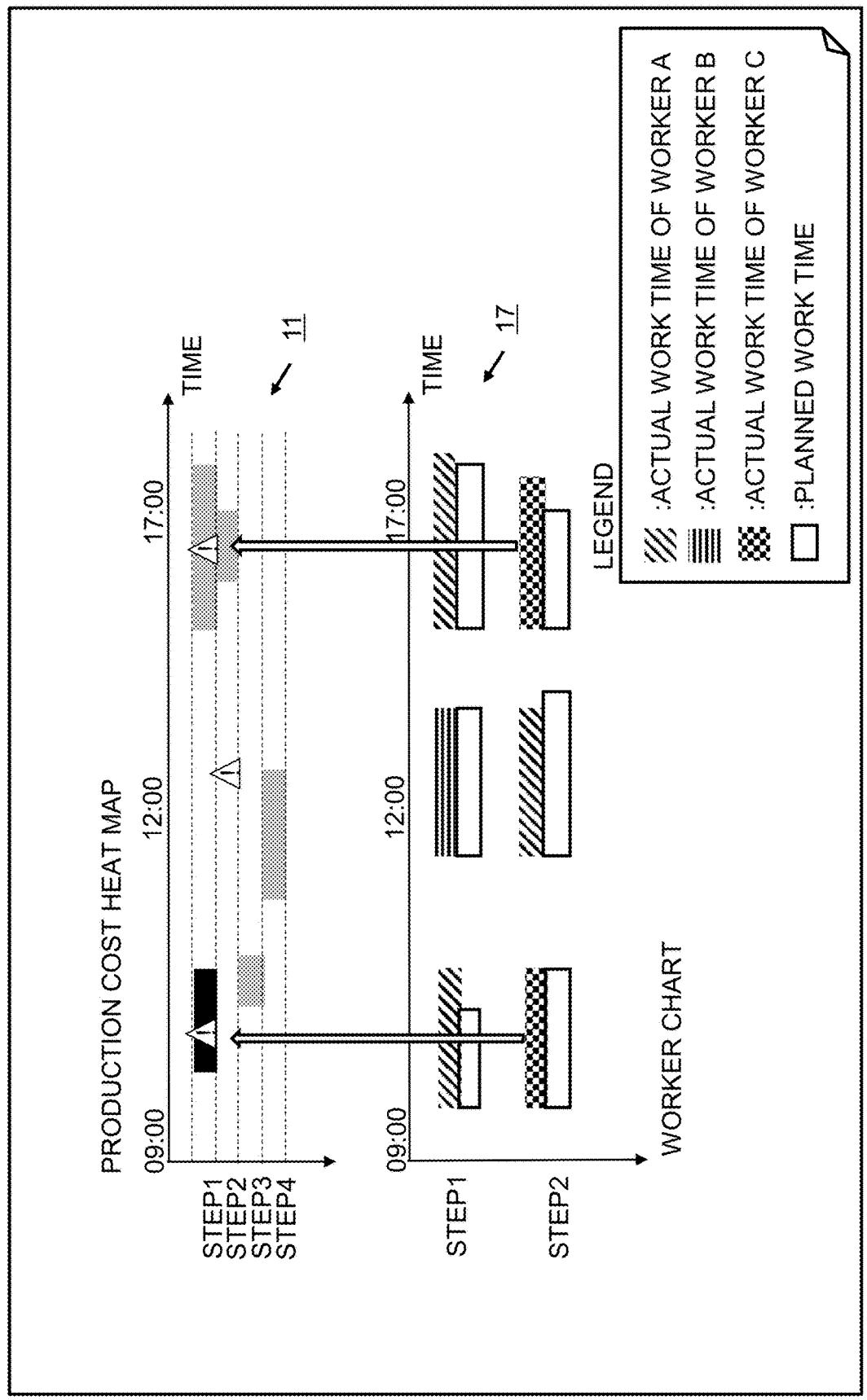
FIG. 18 shows the second example of the alert display control.

With reference to FIGS. 17 and 18, worker (an example of Man) is taken as an example of a resource type. Note that in the following description, "work time" means a time point length of work, and "work time block" means a time range of work.

The management server program 271 calculates, for each worker, an actual work time and a planned work time on a per step basis from the worker past record table 402 and the worker plan table 502. An example of the specific situation is that a difference from an absolute value of a value obtained by subtracting the planned work time from the actual work time is equal to or larger than a certain value.

In the example shown in FIG. 17, the management server program 271 can display, as a worker chart 17 with a time axis and a step axis, a Gantt chart showing the actual work time and the planned work time for each worker on a per step basis.

In the worker chart 17, the specific situation has occurred between 09:00 and 12:00 in step 1 for worker A. Therefore, the management server program 271 determines whether or not an overlap ratio for worker A is equal to or larger than a predetermined ratio. The "overlap ratio" for worker A is a ratio of the number of actual time blocks overlapping a time block in which an excess of cost has incurred to the number of actual time blocks of the worker A. When the determination result is true, the management server program 271 displays three alert objects 80X to 80Z on the cost heat map 11 for three actual time blocks of worker A, as illustrated in FIG. 17. Accordingly, in step 2, the alert object 80Y is displayed for a time block in which no excess of cost has incurred. The user can estimate that a defect may occur in the product corresponding to the time point corresponding to the display position of the alert object 80Y or the time block including that time point. This is because, although the work of worker A is a factor of a large excess of cost, no excess of cost has incurred only at that time point, so it can be estimated that the work may be carelessly executed.

In the worker chart 17, the specific situation has occurred around 17:00 in step 2 for worker C. Therefore, as illustrated in FIG. 18, the management server program 271 determines whether or not an overlap ratio also for worker C is equal to or larger than a predetermined ratio. In this determination, the excess of cost means a differential cost corresponding to the higher of the two levels of density. The determination result becomes false. In this case, the management server program 271 does not display an alert object 80 on the cost heat map 11 for each of two actual time blocks of worker C, as illustrated in FIG. 18. The user can see that the work of worker C does not affect the excess of cost.

While the embodiment of the present invention has been described heretofore, the embodiment is an example for describing the present invention and is not intended to limit the scope of the present invention to the embodiment. The present invention can be implemented even in various other forms.

For example, a display control in cost perspective may be performed without an alert level in cost perspective. Specifically, for example, when the management server program 271 displays the facility chart 16 via the cost heat map 11, the management server program 271 may set the display mode of the alert object 70 to be displayed on the facility chart 16 to the display mode depending on whether or not the alert object 80 corresponding to the alert object 70 has been displayed on the cost heat map 11.

Figure 19:
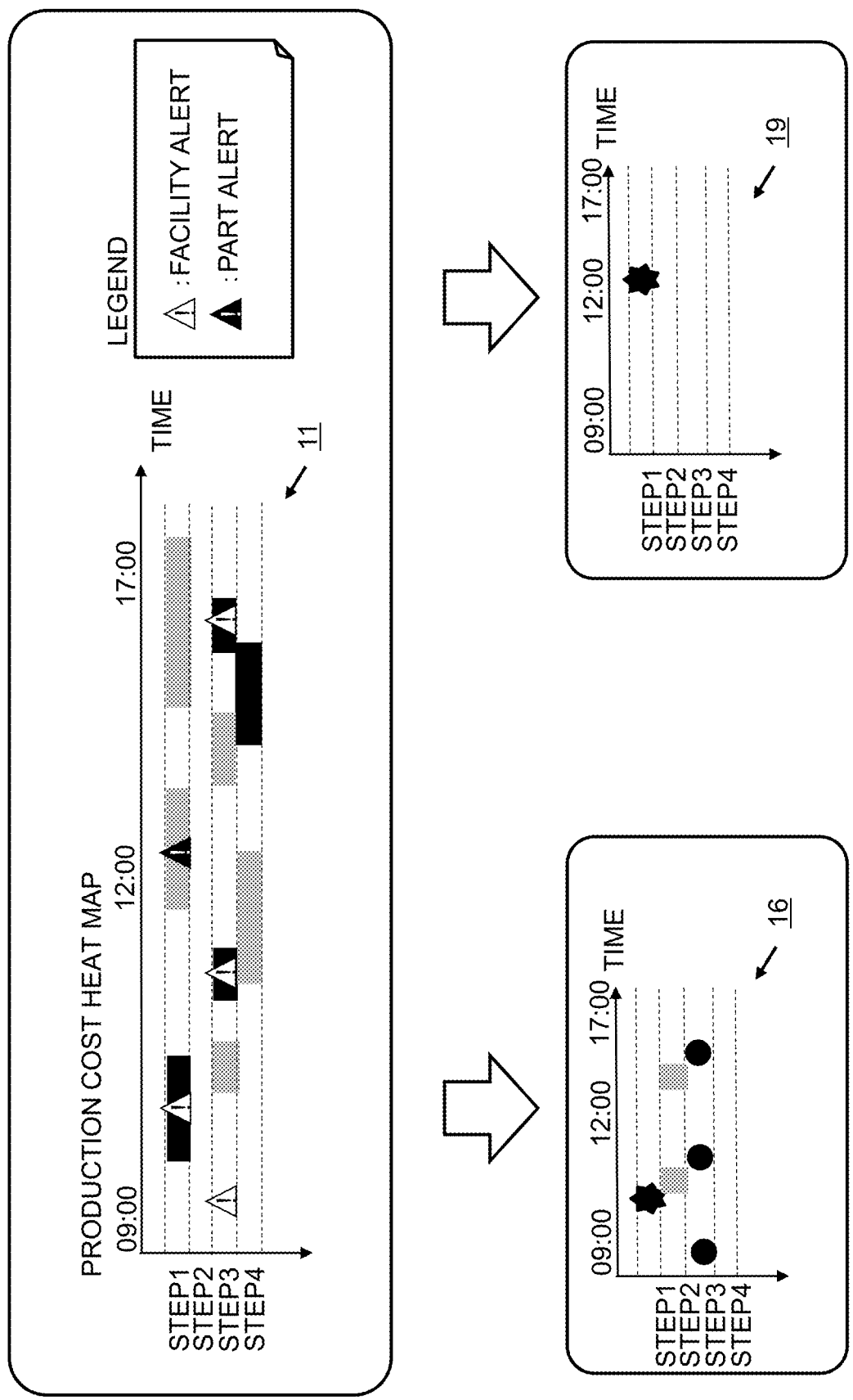
FIG. 19 shows a first modification.

For example, as illustrated in FIG. 19, when the management server program 271 determines to display, for each of two or more resource types other than Money, an alert object for the resource to which the resource type belongs, the management server program 271 may display an alert object for a type of alert corresponding to the resource type on the cost heat map 11. In the example shown in FIG. 19, alert objects for facility and alert objects for part are displayed. When any of the alert objects for facility is specified by the user from the cost heat map 11, the management server program 271 displays the facility chart 16 according to the facility/cost perspective alert level indicated in the facility alert table 803. When any of the alert objects for part is specified by the user from the cost heat map 11, the management server program 271 displays the facility chart 16 according to the part/cost perspective alert level indicated in the part alert table 804. In this way, it is possible to overlook the presence or absence of a specific situation for two or more resource types on the same cost heat map 11, and then overlook the specific situation for the resource type desired by the user in cost perspective.

For example, as illustrated in FIG. 20, the management server program 271 may display, in addition to the cost heat map 11, a material cost heat map 20A and a labor cost heat map 20B that are details of the cost heat map 11 so that the heat maps are arranged side by side in the direction perpendicular to the time axis. The material cost heat map 20A is an example of a material cost chart, and the labor cost heat map 20B is an example of a labor cost chart. Since both the heat maps 20A and 20B are the details of the cost heat map 11, they have a time axis and a step axis whose scales are the same as those of the time axis and step axis (an example of a management unit axis) of the cost heat map 11, respectively. For each excess of cost being displayed on the cost heat map 11, a band having the same display mode and the same length as those of the excess of cost (an example of a display object showing the excess of cost) is displayed on the heat map corresponding to the factor of the excess of cost, of the heat maps 20A and 20B. For each excess of cost, the display position of the band on the heat map 20A or 20B is the same as the display position of excess of cost (time point and step). The alert objects being displayed on the cost heat map 11 are also displayed on the heat map 20A or 20B, similarly to the bands for excess of cost. Which of the heat map 20A and 20B the alert object is to be displayed on is determined according to which of the material cost and the labor cost a larger number of factors of one or more excesses of cost that are affected by the same one or more specific situations corresponding to the alert object is included in. With such a display of details, the user can see overlook the entire costs including the material cost and the labor cost, which are elements of the costs, in addition to the costs.

For example, in the embodiment described above, the so-called 3M: Man, Machine, and Material are adopted as one or more resource types other than Money. However, another resource type may be adopted instead of one of the 3M.

Also, for example, the present invention may be applied to support for management other than production management. Specifically, for example, the present invention may be applied to support for management of an environment where there are none of the resource types of Man, Machine, and Material. In this case, the management information may include information indicating past records of a plurality of resources belonging to one or more resource types including a resource type different from at least one of Man, Machine, and Material, instead of the information indicating the past records of a production system having a plurality of steps. The past record of each resource may include at least the execution time block the resource. As the management unit, a management unit that is adoptable in an environment to which the present invention is applied may be adopted.

We claim:

1. A production management supporting system, comprising:
    at least one interface;
    at least one storage including one or more memories and configured to store management information of a production system having a plurality of steps; and
    at least one processor coupled to the at least one interface and to the at least one storage, wherein
    as a plurality of resource types relating to production, there are two or more resource types that include Money from among resource types of Man, Machine, Material, and Money,
    at least part of the management information is
        execution past record information that indicates, for each of one or more resource types other than Money from among the plurality of resource types and for each resource belonging to the resource type, a step performed on the resource and an execution time block of the step, and
        expense information that indicates, for at least one of the one or more resource types and for each resource belonging to the resource type, an expense relating to the resource,
    the at least one processor executes a cost calculation process that is a process of calculating a relationship between a time point and cost on the basis of the execution past record information and the expense information,
    the at least one processor displays a cost chart that is a chart based on a result of the cost calculation process and that shows costs in management units same as or different from those of steps, and
    the cost chart has a time axis and a management unit axis perpendicular to the time axis,
    wherein
        the at least one processor determines whether or not to display, for a specific situation, an alert object on the cost chart on the basis of relationships (X) to (Z) below:
        (X) one of (x1) and (x2) below:
            (x1) one or more time points when same one or more specific situations have occurred, and
            (x2) with respect to a resource in which the specific situation has occurred, a relationship between an actual time and a planned time and an actual time block;
        (Y) for each of one or more differential costs, a magnitude of the differential cost; and
        (Z) for each of one or more differential costs, a time block in which the differential cost has incurred,
        for each time point, the differential cost is a value obtained by subtracting a planned cost for a time point from an actual cost at a time point,
        for each time point, the actual cost is a cost calculated on the basis of the execution past record information and the expense information, and
        for each time point, the planned cost is a cost scheduled for the time point, wherein
        the at least one processor performs at least one of:
            displaying, in a case where a ratio, at which a differential cost equal to or larger than a predetermined magnitude has incurred at one or more time points when same one or more specific situations have occurred, is equal to or larger than a predetermined ratio, alert objects for all the same one or more specific situations on the cost chart; and
            displaying, for a resource in which the specific situation has occurred, in a case where a ratio of the number of actual time blocks overlapping a time block in which a differential cost equal to or larger than a predetermined magnitude has incurred to the number of actual time blocks of the resource is equal to or larger than a predetermined ratio, an alert object for each actual time block of the resource on the cost chart.

2. The production management supporting system according to claim 1, wherein
    the cost calculation process includes implementing, for each product:
        specifying, from the execution past record information, two or more steps performed to produce the product, and, for each of the two or more steps, one or more resources involved in the step and the execution time block of the step;
        specifying, for each of the two or more specified steps, one or more expenses relating to the specified one or more resources from the expense information; and
        calculating, for each of the specified two or more steps, costs on the basis of the specified one or more expenses, and
    the cost calculation process further includes, for each step and for each time point, calculating costs on the basis of one or more costs calculated for the steps for the one or more products, in a case where there are one or more products, each time point of which belongs to the execution time block of each of the steps.

3. The production management supporting system according to claim 1, wherein
    the cost chart is a cost heat map,
    for each management unit, when a time point having a differential cost exists in a display target period that is a period covered by the time axis, a display mode for the time point depends on a magnitude of the differential cost,
    for each time point, the differential cost is a value obtained by subtracting a planned cost for the time point from an actual cost at the time point,
    for each time point, the actual cost is a cost calculated on the basis of the execution past record information and the expense information in the cost calculation process, and
    for each time point, the planned cost is a cost scheduled for the time point.

4. The production management supporting system according to claim 1, wherein
    a plurality of management units including the plurality of steps have a tree structure, and
    the at least one processor
        receives specification of management units, and
        displays a cost chart for one or more child management units belonging to the specified management unit in the tree structure.

5. The production management supporting system according to claim 1, wherein
an expense indicated by the expense information includes a first type of expense, which is a cost price for each of one or more resources belonging to Material, and a second type of expense, which is an expense per unit time for each of one or more resources belonging to Man, and
for each step, costs to be calculated are based on a material cost as an expense calculated on the basis of the first type of expense for each of one or more resources that are involved in the step and belong to Material, and a labor cost as an expense calculated on the basis of the second type of expense for each of one or more resources that are involved in the execution time block of the step and in the step and belong to Man.

6. The production management supporting system according to claim 5, wherein the at least one processor displays, in addition to the cost chart, a material cost chart and a labor cost chart, which are details of the cost chart, so that the material cost chart and the labor cost chart are arranged side by side in a direction perpendicular to a time axis.

7. The production management supporting system according to claim 1, wherein the at least one processor performs at least one of:
not displaying, in a case where a ratio at which a differential cost equal to or larger than a predetermined magnitude has incurred at one or more time points when same one or more specific situations have occurred is smaller than a predetermined ratio, alert objects for all the same one or more specific situations on the cost chart; and
not displaying, for a resource in which the specific situation has occurred, in a case where a ratio of the number of actual time blocks overlapping a time block in which a differential cost equal to or larger than a predetermined magnitude has incurred to the number of actual time blocks of the resource is smaller than a predetermined ratio, an alert object for any of actual time blocks of the resource on the cost chart.

8. The production management supporting system according to claim 1, wherein
the at least one processor displays one or more alert objects on the cost chart, and displays, when any of the one or more alert objects is specified, a resource chart that is a chart for a target resource type, which is a resource type corresponding to the specified alert object, and that is a chart having a time axis and a management unit axis of which scales are same as those of the time axis and management unit axis of the cost chart, respectively,
for the target resource type, when one or more specific situations have occurred, the resource chart displays, for each of the one or more specific situations, an alert object corresponding to the specific situation with respect to the time point at which the specific situation has occurred, and
a display mode of the alert object that is displayed on the resource chart depends on whether or not an alert object corresponding to the alert object is displayed on the cost chart.

9. The production management supporting system according to claim 1, wherein
the at least one processor displays one or more alert objects on the cost chart, and displays, in a case where any of the one or more alert objects is specified, a resource chart that is a chart for a target resource type, which is a resource type corresponding to the specified alert object, and that is a chart having a time axis and a management unit axis of which scales are same as those of the time axis and management unit axis of the cost chart, respectively,
for each of the one or more resource types, an alert level is associated with each specific situation,
the at least one processor portion associates, for a resource type of a resource in which a specific situation has occurred, a new alert level, which is obtained by addition of perspective of Money with respect to the resource type, with the specific situation on the basis of (X) to (Z) relationships and (α) below:
(X) one of (x1) and (x2) below:
(x1) one or more time points when same one or more specific situations have occurred, and
(x2) with respect to a resource in which the specific situation has occurred, a relationship between an actual time and a planned time and an actual time block;
(Y) for each of one or more differential costs, a magnitude of the differential cost;
(Z) for each of one or more differential costs, a time block in which the differential cost has incurred; and
(α) an alert level associated with the specific situation,
for each time point, the differential cost is a value obtained by subtracting a planned cost for a time point from an actual cost at a time point,
for each time point, the actual cost is a cost calculated on the basis of the execution past record information and the expense information,
for each time point, the planned cost is a cost scheduled for the time point, and
for the target resource type, in a case where one or more specific situations have occurred, the resource chart displays, for each of the one or more specific situations, an alert object corresponding to the specific situation with respect to the time point at which the specific situation has occurred, and a display mode of the alert object is based on a new alert level associated with the specific situation.

10. The production management supporting system according to claim 9, wherein
as resource types other than Money, there are two or more resource types from among resource types of Man, Machine, and Material, and
the at least one processor, upon determining, for each of the two or more resource types, to display an alert object for a resource to which the resource type belongs, displays an alert object for an alert of type that corresponds to the resource type on the cost chart.

11. A production management supporting method, comprising executing a cost calculation process that is a process of calculating a relationship between a time point and cost on the basis of execution past record information and expense information, wherein
the execution past record information and the expense information are at least part of management information of a production system having a plurality of steps,
as a plurality of resource types relating to production, there are two or more resource types including Money from among resource types of Man, Machine, Material, and Money,
the execution past record information indicates, for each of one or more resource types other than Money from among the plurality of resource types and for each resource belonging to the resource type, a step performed on the resource and an execution time block of the step, and the expense information indicates, for at least one of the one or more resource types and for each resource belonging to the resource type, an expense relating to the resource, the method comprising the steps of:

displaying a cost chart that is a chart based on a result of the cost calculation process, shows costs in management units same as or different from those of steps, and has a time axis and a management unit axis perpendicular to the time axis, determining whether or not to display, for a specific situation, an alert object on the cost chart on the basis of relationships (X) to (Z) below:

(X) one of (x1) and (x2) below:
  (x1) one or more time points when same one or more specific situations have occurred, and
  (x2) with respect to a resource in which the specific situation has occurred, a relationship between an actual time and a planned time and an actual time block:
(Y) for each of one or more differential costs, a magnitude of the differential cost; and
(Z) for each of one or more differential costs, a time block in which the differential cost has incurred, for each time point, the differential cost is a value obtained by subtracting a planned cost for a time point from an actual cost at a time point, for each time point, the actual cost is a cost calculated on the basis of the execution past record information and the expense information, and for each time point, the planned cost is a cost scheduled for the time point, displaying, in a case where a ratio, at which a differential cost equal to or larger than a predetermined magnitude has incurred at one or more time points when same one or more specific situations have occurred, is equal to or larger than a predetermined ratio, alert objects for all the same one or more specific situations on the cost chart; and displaying, for a resource in which the specific situation has occurred, in a case where a ratio of the number of actual time blocks overlapping a time block in which a differential cost equal to or larger than a predetermined magnitude has incurred to the number of actual time blocks of the resource is equal to or larger than a predetermined ratio, an alert object for each actual time block of the resource on the cost chart.

12. A non-transitory computer readable storage medium storing thereon at least one computer program for causing at least one processor to implement executing a cost calculation process that is a process of calculating a relationship between a time point and cost on the basis of execution past record information and expense information, wherein the execution past record information and the expense information are at least part of management information of a production system having a plurality of steps, as a plurality of resource types relating to production, there are two or more resource types including Money from among resource types of Man, Machine, Material, and Money, the execution past record information indicates, for each of one or more resource types other than Money from among the plurality of resource types and for each resource belonging to the resource type, a step performed on the resource and an execution time block of the step, and the expense information indicates, for at least one of the one or more resource types and for each resource belonging to the resource type, an expense relating to the resource, wherein the at least one processor, when executing the at least one computer program, is configured to:

display a cost chart that is a chart based on a result of the cost calculation process, the cost chart shows costs in management units same as or different from those of steps, and has a time axis and a management unit axis perpendicular to the time axis, determine whether or not to display, for a specific situation, an alert object on the cost chart on the basis of relationships (X) to (Z) below:

(X) one of (x1) and (x2) below:
  (x1) one or more time points when same one or more specific situations have occurred, and
  (x2) with respect to a resource in which the specific situation has occurred, a relationship between an actual time and a planned time and an actual time block;
(Y) for each of one or more differential costs, a magnitude of the differential cost; and
(Z) for each of one or more differential costs, a time block in which the differential cost has incurred, for each time point, the differential cost is a value obtained by subtracting a planned cost for a time point from an actual cost at a time point, for each time point, the actual cost is a cost calculated on the basis of the execution past record information and the expense information, and for each time point, the planned cost is a cost scheduled for the time point, display, in a case where a ratio, at which a differential cost equal to or larger than a predetermined magnitude has incurred at one or more time points when same one or more specific situations have occurred, is equal to or larger than a predetermined ratio, alert objects for all the same one or more specific situations on the cost chart; and display, for a resource in which the specific situation has occurred, in a case where a ratio of the number of actual time blocks overlapping a time block in which a differential cost equal to or larger than a predetermined magnitude has incurred to the number of actual time blocks of the resource is equal to or larger than a predetermined ratio, an alert object for each actual time block of the resource on the cost chart.

* * * * *